US012749361B2

(12) United States Patent
Stötter

(10) Patent No.: US 12,749,361 B2
(45) Date of Patent: Sep. 29, 2026

(54) ELECTRONIC LOCK DEVICE, IN PARTICULAR A KEY SAFE, AND METHOD FOR OPERATING THE ELECTRIC LOCK DEVICE

(71) Applicant: SMART ACCESS SOLUTIONS GMBH, Munich (DE)

(72) Inventor: Tobias Stötter, Munich (DE)

(73) Assignee: SMART ACCESS SOLUTIONS GMBH, Munich (DE)

( * ) Notice: Subject to any disclaimer, the term of this patent is extended or adjusted under 35 U.S.C. 154(b) by 561 days.

(21) Appl. No.: 18/267,904

(22) PCT Filed: Dec. 16, 2021

(86) PCT No.: PCT/EP2021/086309
§ 371 (c)(1),
(2) Date: Jun. 16, 2023

(87) PCT Pub. No.: WO2022/129411
PCT Pub. Date: Jun. 23, 2022

(65) Prior Publication Data
US 2024/0062603 A1 Feb. 22, 2024

(30) Foreign Application Priority Data
Dec. 18, 2020 (DE) ..................... 10 2020 216 345.6

(51) Int. Cl.
*G07C 9/00* (2020.01)

(52) U.S. Cl.
CPC ..... *G07C 9/00912* (2013.01); *G07C 9/00309* (2013.01); *G07C 9/00944* (2013.01);
(Continued)

(58) Field of Classification Search
CPC ........... G07C 2009/00373; G07C 2009/00539; G07C 2009/00642; G07C 2009/00746;
(Continued)

(56) References Cited

U.S. PATENT DOCUMENTS 9,852,565 B2 12/2017 Engel-Dahan
11,551,500 B2 1/2023 Stötter
(Continued)

FOREIGN PATENT DOCUMENTS

CA 3048618 A1 7/2018
DE 102006045195 B2 4/2008
(Continued)

*Primary Examiner* — Omer S Khan
(74) *Attorney, Agent, or Firm* — Abel Schillinger, LLP

(57) ABSTRACT

The present invention relates to an electric locking device (10) comprising.

Figure 1:
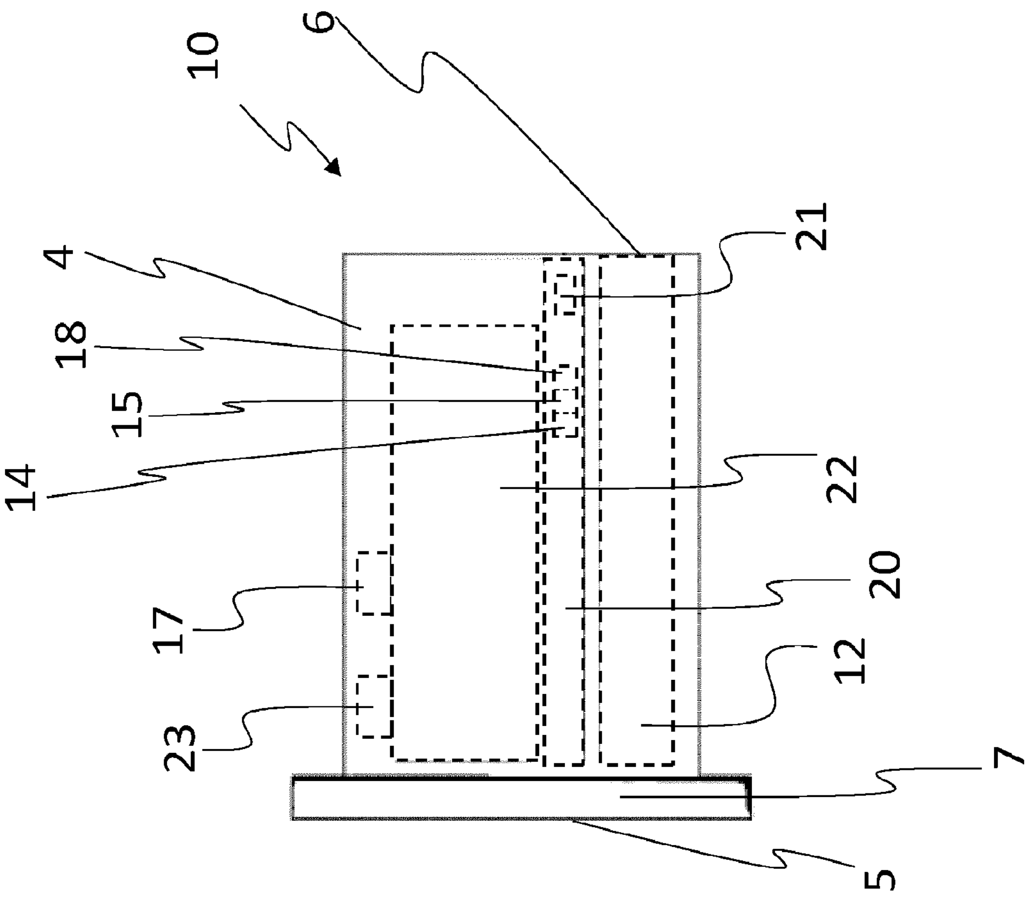

at least one sensor device for detecting at least one movement of the locking device (10) and for generating sensor signals and/or sensor data in dependence on the detected movement, at least one power source (22) other than a fixed power supply for operating at least the actuator (12), the near-field data transmission device (14), the memory unit (18), the processor device (20) and/or the sensor device, and at least one control device for activating one or more devices deactivated in an idle state, wherein the device deactivated in the idle state is at least one or more of the following devices: the actuator (12), the near field data transmission device (14), the memory unit (18) and/or the processor device (20).

29 Claims, 12 Drawing Sheets

(52) U.S. Cl.
CPC .............. *G07C 2009/00539* (2013.01); *G07C 2009/00777* (2013.01)

(58) Field of Classification Search
CPC ........... G07C 2009/00777; G07C 2009/00936; G07C 9/00309; G07C 9/00571; G07C 9/00912; G07C 9/00944
See application file for complete search history.

(56) References Cited

U.S. PATENT DOCUMENTS

| | | | | |
|---|---|---|---|---|
| 2005/0232747 | A1* | 10/2005 | Brackmann | B60P 3/14 414/803 |
| 2009/0167526 | A1 | 7/2009 | Graves et al. | |
| 2011/0005282 | A1* | 1/2011 | Powers | G08B 25/10 70/63 |
| 2014/0051407 | A1* | 2/2014 | Ahearn | G07C 9/00174 455/414.1 |
| 2016/0032621 | A1 | 2/2016 | Johnson | |
| 2016/0042582 | A1 | 2/2016 | Hyde | |
| 2019/0169874 | A1 | 6/2019 | Gengler | |
| 2019/0333301 | A1 | 10/2019 | Imanuel | |
| 2020/0187694 | A1* | 6/2020 | Santangeli | G07F 17/12 |
| 2020/0327756 | A1 | 10/2020 | Alhalabi | |
| 2020/0349786 | A1 | 11/2020 | Ho | |

FOREIGN PATENT DOCUMENTS

| | | | |
|---|---|---|---|
| DE | 102015113243 | A1 | 2/2017 |
| EP | 3058553 | B1 | 7/2019 |
| EP | 3627458 | A2 | 3/2020 |
| WO | 2015054667 | A1 | 4/2015 |
| WO | 2020151987 | A1 | 7/2020 |

* cited by examiner

ELECTRONIC LOCK DEVICE, IN PARTICULAR A KEY SAFE, AND METHOD FOR OPERATING THE ELECTRIC LOCK DEVICE

The present invention relates to an electronic locking device, a method of operating the electronic locking device, a computer program product for carrying out the method, and to a system.

The key safes generally comprise a metal cylinder which is fixed in the masonry. The lock is then slipped on from the front. In the simple case, the actual lock in the closure consists of a standard half cylinder. However, there are different variants with one or more locking pins.

The object/key to be protected is in turn attached to the lock so that it can be removed together with the lock after the lock has been opened. Either the key to be protected is so firmly attached to the closure that it cannot be separated from the cover. However, it is common practice that, especially when several keys are stored in the safe, these can also be removed from the lock, since the lock has a not inconsiderable weight, especially in the case of larger tubular safes.

However, known key safes have a number of disadvantages. There is no centrally monitored key management, so that on the one hand it is not possible to track who opened the safe and when. Secondly, it is not possible to centrally block lost keys (for opening the safe) without replacing the lock mechanism and thus all keys of all users. Furthermore, it is not possible to monitor whether the person who opened the safe also locked it again, or whether the lock was even put back into the cylinder. Furthermore, it is also not possible to monitor whether an item has been removed or returned. Furthermore, it cannot be determined whether there have been unauthorized access attempts if these have not left any visible damage to the lock/cylinder.

Furthermore, the document WO2020151987A1 discloses an advantageous system for managing access rights, in particular in the case where there is no Internet connection during access to a container. However, this document does not disclose a solution to the aforementioned problems.

It is therefore the object of the present invention to provide an electrical locking device, a method of operating such an electrical locking device, and a system comprising at least one such electrical locking device, in an improved form. Preferably, at least one of the problems described at the beginning is to be solved and, particularly preferably, several or all of said problems are to be solved.

The aforementioned problem is solved according to the invention by an electronic locking device for locking a container, in particular for retrofitting a key safe. The locking device according to the invention thereby preferably comprises at least: An electrically operable actuator for transferring the electric locking device from a closed configuration into an open configuration, wherein it is possible for the actuator to cause at least one latch element of a locking device to be moved from a latch receptacle into a region outside the latch receptacle, or for transferring the electric locking device from an open configuration into a closed configuration, wherein it is possible for the actuator to cause the at least one latch element of the locking device to be moved from the region outside the latch receptacle into the latch receptacle. Furthermore, the locking device according to the invention preferably has a near-field data transmission device for receiving data from at least one mobile terminal temporarily located in a defined distance range from the electronic locking device and for transmitting data, in particular access data, to the at least one mobile terminal temporarily located in a defined distance range from the electronic locking device. Furthermore, the electronic locking device according to the invention preferably comprises a memory unit for at least temporarily storing time data and/or access data. The time data thereby preferably comprise at least data on the last opening time (reaching the opened configuration) and/or at least data on the last closing time (reaching the closed configuration). The access data preferably have at least authorization data and identification data, wherein the authorization data preferably define in dependence on which identification data the actuator transfers the locking device from the closed configuration to the opened configuration. The identification data preferably specify an assignment to the mobile terminal. Furthermore, the locking device according to the invention preferably comprises a processor device for matching the authorization data and the identification data. The actuator is preferably controllable by the processor device for opening the locking device in case of a positive matching, wherein a positive matching represents a defined correspondence of the matched data.

This solution is advantageous as a digitally controllable electric locking device is provided.

Further preferred embodiments of the present invention are the subject of the following description parts.

Furthermore, the locking device according to the invention preferably additionally or alternatively comprises at least one sensor device for detecting at least one movement of the locking device and for generating sensor signals and/or sensor data as a function of the detected movement. Additionally or alternatively, the locking device according to the invention preferably comprises at least one energy source other than a fixed current connection for operating at least the actuator and/or the near-field data transmission device and/or the memory unit and/or the processor device and/or the sensor device.

Particularly preferably, the locking device according to the invention preferably comprises at least one control device for activating one or more device(s) deactivated in an idle state. The device(s) deactivated in an idle state are preferably at least one or more of the following devices: the actuator and/or the near-field data transmission device and/or the memory unit and/or the processor device. The control device is preferably connected to the sensor device at least via a signal and/or data connection. Sensor data or sensor signals generated by the sensor device are preferably transmittable to the control device via the signal and/or data connection. At least one deactivated device can preferably be activated by the control device as a function of the sensor data or sensor signals.

This solution is advantageous because an electronic locking device is provided which is very energy-efficient. For example, in key safes, in particular in key safes installed in a masonry and preferably round key safes, the space available to an electronic locking device is very limited. Such key safes usually have a diameter of less than 10 cm or less than 8 cm or less than 7.5 cm or less than 7 cm or less than 6.5 cm or less than 6 cm or less than 5.5 cm or less than 5 cm or less than 4.5 cm. Therefore, the installation space that can be provided for an energy source, in particular electric battery, in particular lithium-ion battery, is very small. Such electric locking devices are usually operated only a few times per year, in particular in many cases even only once every few years (more than 2 years). The present solution makes it possible to significantly reduce power consumption by deactivating a plurality of electrical loads or by transferring a plurality of electrical loads to an idle state.

Deactivated here describes a state in which the respective device consumes in a defined period of time, in particular 1 second or 1 minute or 1 hour or 1 day less than 20%, in particular less than 10% or less than 5% or less than 1% or less than 0.5% or less than 0.05% of the electrical energy required in normal operation, in particular in the same period of time, of the respective device.

The sensor device and the control device may additionally or alternatively be connected to each other by means of a power supply connection. Preferably, the sensor device can be activated by the control device at predetermined intervals for a predefined period of time.

Alternatively, it is conceivable that the sensor device is permanently active, in particular directly connected to the power source via a power supply connection. In this case, the sensor device and the control device are preferably connected to each other only via a signal and/or data connection.

The control device can be connected to one or more, in particular all, of the devices: Actuator for transferring the electric locking device from a closed configuration to an open configuration or from an open configuration to a closed configuration, the near-field data transmission device, the memory unit and/or the processor device via one or more signal and/or data connection(s).

It is possible here that one or more, in particular all, of the device/s. Actuator for transferring the electric locking device from a closed configuration to an open configuration or from an open configuration to a closed configuration, the near-field data transmission device, the memory unit and/or the processor device are each connected directly or indirectly to the power source. Preferably, therefore, the actuator for transferring the electric locking device from a closed configuration to an open configuration or from an open configuration to a closed configuration is directly or indirectly connected to the power source and/or the near-field data transmission device is preferably directly or indirectly connected to the power source and/or the memory unit is preferably directly or indirectly connected to the power source and/or the processor device is preferably directly or indirectly connected to the power source.

Additionally or alternatively, however, it is also possible that one or more, in particular all, of the device/s: Actuator for transferring the electric locking device from a closed configuration to an open configuration or from an open configuration to a closed configuration, near-field data transmission device, memory unit and/or processor device is/are connected to the control device via one or more signal and/or data connection(s) and via one or more power connection(s). Preferably, the actuator for transferring the electric locking device from a closed configuration to an open configuration or from an open configuration to a closed configuration is thus directly or indirectly connected to the control device via one or more signal and/or data connection(s) and/or a power connection and/or the near-field data transmission device is preferably directly or indirectly connected to the control device via one or more signal and/or data connection(s) and/or a power connection and/or data connection(s) and/or a power connection to the control device and/or the memory unit is preferably connected directly or indirectly via one or more signal and/or data connection(s) and/or a power connection to the control device and/or the processor device is preferably connected directly or indirectly via one or more signal and/or data connection(s) and/or a power connection to the control device.

The control device is preferably an ultra-low power unit or ultra-low power processor. An ultra-low power unit preferably consists of few components. Basically, it preferably consists of only a crystal or better a real time clock as a clock generator and a few logic components that can perform a defined action, for example, when an IO port changes from high to low because a sensor has struck. An Ultralow power unit can be already built into a processor as a "submodule". An example of such a processor is ESP32 (https://www.macnica.eu/de/knowledge-base/hi-q-news/2018-06-15-das-ultra-low-power-management-des-esp32).

According to another preferred embodiment of the present invention, at least the actuator and the near-field data transmission device are disabled in the idle state, preferably at least the actuator, the near-field data transmission device and the memory unit are disabled in the idle state. This embodiment is advantageous because the actuator and the near-field data transmission device cause a significant portion of the total power consumption in the operating state, and therefore their deactivation or transfer to the idle state significantly relieves the power source.

Thus, in the idle state, preferably less than the power required to operate the actuator is provided to the actuator and/or less than the power required to operate the near-field data transfer device is provided to the near-field data transfer device and/or less than the power required to operate the memory unit is provided to the memory unit and/or less than the power required to operate the processor device is provided to the processor device.

According to another preferred embodiment of the present invention, an elongate base body is provided, the elongate base body having a first end and a second end spaced longitudinally of the base body from the first end, the first end having actuating device for moving the base body, the actuator, the near-field data transmission means, the memory unit, the processor device, the power source, the control device, the sensor device, and a locking device movable by the actuator being arranged longitudinally spaced from the actuating device. The actuator, the near-field data transmission device, the memory unit, the processor device, the sensor device and the energy source are connected at least indirectly, and preferably directly, to the base body, in particular form a common assembly. Additionally or alternatively, at least one latch element of the latch device is preferably provided in the region of the first end of the base body, in particular closer spaced apart from the first end than from the second end of the base body. Additionally or alternatively, the base body preferably forms a front cover for covering a container, in particular a safe, or has a front cover for covering the container, in particular the safe.

This embodiment is advantageous because the electric locking device can thereby have a very compact design. Furthermore, at least in a closed configuration, i.e. when the locking device locks a container, the electrical components are arranged inaccessibly and therefore protected from the weather and vandalism.

According to another preferred embodiment of the present invention, the actuating device is configured for manually applying forces to the base body for moving the base body relative to the environment.

This embodiment is advantageous because operators can directly interact mechanically with the electrical locking device. Preferably, the actuating device is namely freely accessible or not yet covered by another cover or protective device or flap or lid.

According to a further preferred embodiment of the present invention, the sensor device comprises at least one acceleration sensor, wherein the acceleration sensor is designed to output acceleration signals and/or acceleration data as a function of forces introduced via the actuating device.

This embodiment is advantageous because defined movements can be introduced into the electric locking device via the actuating device. Since the sensor device together with the base body or the actuating device form an assembly or are part of a common assembly, movements that can be introduced into the base body via the actuating device can be detected by the sensor device.

According to a further preferred embodiment of the present invention, the actuating device is of plate-like design, in particular flat and with roughness RA<25 μm, and is preferably used for manually initiating knocking pulses.

This embodiment is advantageous because the flat design of the actuating device means that forces can be introduced into the electric locking device preferably exclusively in the longitudinal direction of the actuating device. Vandalism or faulty actuation is thus prevented to a high degree.

According to a further preferred embodiment of the present invention, the control device is configured for activating one or more or all of the deactivated device in dependence on a predetermined code, the code comprising at least a sequence of acceleration signals and/or acceleration data, wherein acceleration signals and/or acceleration data output by the acceleration sensor can be evaluated by the control device for checking the code.

This embodiment is advantageous because a predefined knocking sequence can be used to transfer the electric locking device from the idle mode to the operating mode. This is further advantageous because the operator does not need any additional mechanical keys, which means that complex key management with regard to the mechanical keys can be avoided, thus high costs, especially in the case of an overall system with a very large number of locking devices can be avoided. Furthermore, the currently valid knocking sequence can be transmitted electronically to an operator in advance or via a mobile terminal, such as a tablet PC, laptop, smartwatch or cell phone. The knocking sequence can be, for example, short-short-short-long-long-short or short-medium-long-short-medium-long. Here, "short", "medium" and "long" stand for the time intervals between two shocks (knocking pulses). Additionally or alternatively the parameter vibration strength (knocking pulse strength) can be included, this can be defined e.g. by "weak", "medium" and "strong". In this case, "weak", "medium" and "strong" each stand for a vibration strength (knocking pulse strength), in particular in a strength range in each case. From this, e.g. knocking sequences such as strong-weak-strong-strong-medium can be realized. Furthermore, the parameters "time" and "strength" can be combined, whereby more complex knocking sequences, such as weak/medium-strong/medium-strong/long can then be defined.

According to another preferred embodiment of the present invention, the sensor device comprises at least one position sensor, in particular a gyroscope, for detecting one or more rotational movements. This embodiment is advantageous, since rotations of the electric locking device can thereby be detected. These rotations can preferably be detected in addition to or as an alternative to the shocks (knocking pulses).

According to a further preferred embodiment of the present invention, the actuating device has at least one lever element, in particular a handle; for at least partial rotation of the base body and preferably serves to manually initiate rotational movements. This embodiment is advantageous because it allows the locking device to be rotated about its longitudinal axis. This can be done in addition or as an alternative to the shocks (knocking pulses).

According to another preferred embodiment of the present invention, the control device is configured to activate one or more or all of the deactivated device in response to a predetermined code. The code thereby comprises or consists of at least one sequence of position signals and/or position data, wherein position signals and/or position data output by the position sensor can be evaluated by the control device for checking the code. This embodiment is advantageous because a predefined rotation sequence can be used to transfer the electric locking device from the idle mode to the operating mode. This is further advantageous because the operator does not need any additional mechanical keys, which means that complex key management with regard to the mechanical keys can be dispensed with, thus avoiding high costs, especially in the case of an overall system with a very large number of locking devices can be avoided. Furthermore, the currently valid rotation sequence can be transmitted electronically to an operator in advance or via a mobile terminal, such as a tablet PC, laptop, smartwatch or cell phone. The rotation sequence can be, for example, 30° left-40° right-30° left or 90° left-defined pause-10° left-20° right-defined pause-80° right. A "defined pause" is preferably judged to be a period of time defined by a minimum duration and/or a maximum duration. In addition, the electric locking device can also have the acceleration sensors for detecting shocks (knocking pulses). Then, for example, combined rotation/knock sequences, such as "30° left, weak/medium, long, 40° right" are possible.

According to a further preferred embodiment of the present invention, the near-field data transmission device can be activated by the control device as a result of the verification of the code, wherein signals and/or data for opening the locking device can be received by means of the near-field data transmission device, wherein the near-field data transmission device is designed for transmitting and receiving signals and/or data by radio, in particular Bluetooth, WLAN, ZigBee, Z-Wave or NFC. This embodiment is advantageous because, preferably, the near-field data transmission device is not activated to receive the opening commands until the correct sequence has been detected. This results in a very secure and cost-effective procedure, since the operator must first know the sequence (wake-up sequence, i.e., rotation sequence and/or knocking sequence) and then have a mobile terminal that must be configured to send the opening commands.

According to another preferred embodiment of the present invention, at least one directional antenna is provided, wherein the directional antenna is provided for transmitting energy/data and/or signals to a preferably passive NFC tag, in particular RFID tag, and/or for receiving energy/data and/or signals from the RFID tag. The directional antenna is particularly preferably connected to the processor device. Preferably, data and/or signals from the NFC tag, in particular RFID tag, can be fed to the processor device via the directional antenna up to a maximum distance between the NFC tag, in particular RFID tag, and the directional antenna, wherein the maximum distance is preferably less than 30 mm, in particular less than 20 mm or less than 10 mm. The data and/or signals from the NFC tag, in particular RFID tag, preferably represent at least position signals and/or position data, wherein a target orientation of the locking device is preferably represented by the position signals and/or position data, and/or wherein the data and/or signals from the NFC tag, in particular RFID tag, represent at least installation data, wherein an assignment of the locking device to the NFC tag, in particular RFID tag, can be evaluated by the installation data. This solution is advantageous because it makes it possible to ensure that the locking device is always correctly aligned in the operating state. Furthermore, it can be checked whether the locking device is installed at all.

According to a preferred embodiment of the present invention, an elongated base body is provided, wherein the elongated base body has a first end and a second end spaced from the first end in the longitudinal direction of the base body. Preferably, the actuator, the near-field data transmission device, the memory unit, the processor device, the interlocking device, the power source and the directional antenna are at least indirectly, and preferably directly, connected to the base body, in particular, these devices form a common assembly. The directional antenna is particularly preferably arranged for transmitting energy and/or data and/or signals in the radial direction of the base body. Preferably, at least one latch element of the latch device is provided in the region of the first end of the basic body, in particular closer spaced from the first end than from the second end of the basic body. Additionally or alternatively, the base body preferably forms a front cover for covering a container, in particular a safe, or has a front cover for covering the container, in particular the safe. Additionally or alternatively, the first end, in particular the front cover, comprises an actuating device for moving the base body, wherein the actuator, the near-field data transmission device, the memory unit, the processor device, the power source, the directional antenna and the locking device are arranged at a distance from the actuating device in the longitudinal direction. This embodiment is advantageous because a movement of the base body also causes a movement of the directional antenna, whereby a defined alignment of the components of the locking device with respect to the environment is specified via the defined positioning of the directional antenna with respect to the environment, in particular with respect to a container, in particular with respect to an NFC tag arranged in the container.

According to a preferred embodiment of the present invention, the directional antenna is an inductive element. Preferably, the directional antenna is arranged or formed in conductor tracks of the circuit board. Alternatively, the directional antenna is integrated into or arranged on the peripheral wall of the base body. The antennas of the lock body or the locking device and the NFC tag, in particular RFID tag, are particularly preferably inductive elements (so-called air coils), which are not only technically (frequency) but also geometrically matched to each other so that data transmission can take place between these two. Thus, communication is only possible over a short distance and only if the antennas are at a defined angle to each other, in particular less than +/−45°, especially less than +/−30° or less than +/−20° or less than +/−10° or less than +/−5° or less than +/−2°. Ideally, the antennas lie perfectly flat on top of each other.

According to a preferred embodiment of the present invention, the latch element is formed as a locking pin. Additionally or alternatively, the directional antenna is arranged at a defined angle to the locking pin, wherein the directional antenna is aligned in an operating state in a position by which it is predetermined that the locking pin is displaceable in a direction which differs from a perpendicularly downwardly oriented direction, in particular differs by at least +/−5° or at least +/−10° or +/−15° or +/−20°.

A standard lock body or locking device for pipe safes will generally always have one or more locking devices, in particular one or more locking elements, such as one or more locking pins, which protrudes from the lock body or locking device in the locked state and "engage" in a provided notch in the lock cylinder. Since tube safes are usually mounted on/in facades of buildings, they are often exposed to the weather. Splash water/leaks or condensation can cause moisture to collect in the cylinder or in the notch (lowest point). If the lock body happens to be installed in such a way that the locking pin points directly downwards, the moisture in the notch can freeze the locking pin in icy temperatures. If you now want to open the lock, this is only possible with increased force, which can lead to damage to the lock (with classic lock cylinders, the key usually breaks off).

If one now wants the lock body to be inserted into the cylinder in such a way that the locking pin is at an angle that makes freezing in the locked state unlikely, then this can be achieved by suitable positioning of the NFC tag, especially RFID tags. Since the tag can only be read by the lock body when they are at a defined angle to each other, a closing command can be suppressed on the software side until the lock is in the intended position.

Since retrofitting of tubular safes constructed for locking cylinders have the notch for engaging the locking pin always at a defined distance from the front plate and has a defined width and depth, it is possible to design a tool that uses the notch as a guide to position the NFC tag, in particular the RFID tag, in the cylinder at a defined distance from the notch/front. If it is further provided that the positioning device can be fixed at a defined angle to the transverse axis of the cylinder, then the NFC tag, in particular RFID tag, can be placed not only at the correct depth but at exactly the right position that the lock body has to be inserted in desired position for the lock to lock.

According to a preferred embodiment of the present invention, the near field data transmission device is controllable by the processor device to transmit target position data when the processor device receives position signals and/or position data representing a target orientation of the locking device. This embodiment is advantageous, since in all other cases the additional consumption of electrical energy, e.g. by the near-field data transmission device, can thereby be avoided.

According to a preferred embodiment of the present invention, locking commands for locking the locking device are receivable from the near-field data transmission device in response to the target position data transmitted by the near-field data transmission device, wherein the actuator is controllable by the processor device in dependence on the received locking commands for locking the locking device. This embodiment is advantageous because it allows the locking device to be transferred to a closed configuration, in particular without further interaction by an operator.

According to a preferred embodiment of the present invention, a lock sensor, in particular a touch sensor or a light barrier, is provided for monitoring the closed configuration. Preferably, closure signals and/or closure data are generatable by the closure sensor. Preferably, the closure signals and/or closure data in one configuration represent the presence of the latch element in the latch receptacle and/or the closure signals and/or closure data represent in another configuration the presence of the latch element outside the latch receptacle. This embodiment is advantageous because it can ensure that the locking device is actually transferred in an operational state (locking the container).

According to a preferred embodiment of the present invention, the near field data transmission device is controllable by the processor device for transmitting target position data, in particular when the processor device receives position signals and/or position data representing a target orientation of the locking device and when the processor device receives locking signals and/or locking data of the locking sensor in the configuration in which the locking signals and/or locking data represent the presence of the latch element in the latch receptacle. This embodiment is advantageous because multiple parameters are monitored that are detected by different sensors or detection devices, making it impossible or very difficult to circumvent.

Furthermore, the electric locking device preferably comprises a receiving device for receiving at least one holding device for holding at least one object, in particular at least one mechanical key. Furthermore, the electric locking device preferably comprises at least one detection device for detecting the presence of the at least one holding device in or on the receiving device and for generating detection signals and/or detection data depending on the detected presence. Further, the electric locking device preferably comprises at least one power source other than a fixed power supply for powering at least the actuator, the near field data transmission device, the memory unit, the detection device and/or the processor device.

This solution is advantageous because it is detectable whether the holding device is present and/or correctly positioned. It is thereby possible to prevent a relocking of a container, in particular a safe, such as a key safe, should the holding device either not be present and/or not be correctly positioned. This ensures that an operator does not forget to re-secure the holding device.

According to a preferred embodiment of the present invention, the holding device forms a defined shaped holding area for limiting the insertion of holding devices to holding devices having a corresponding shape, and/or the holding device forms a holding area, wherein the holding area is configured for form-closure and/or friction-closure and/or field-locking retention of the holding device. This embodiment is advantageous, since preferably only holding devices of defined design can be coupled to the receiving area. Thus, it can be prevented that different holding devices, e.g. of different devices, can be interchanged.

According to a preferred embodiment of the present invention, the detection device is arranged in the region of the receiving region, in particular arranged adjacent to the receiving region. The detection device is preferably connected to the processor device at least indirectly and preferably directly for transmitting energy, data and/or signals to the processor device.

This embodiment is advantageous because it allows the electric locking device to determine very precisely whether the holding device is positioned or arranged in the receiving device.

According to a preferred embodiment of the present invention, an elongated base body is provided, wherein the elongated base body has a first end and a second end spaced from the first end in the longitudinal direction of the base body, wherein the actuator, the near-field data transmission device, the memory unit, the processor device, the locking device, the power source, the holding device and the detection device are at least indirectly, and preferably directly, connected to the base body, in particular form a common assembly. The first end of the base body preferably has a cover, in particular a front cover, wherein the cover in an operating configuration on the one hand faces the surroundings and on the other hand is oriented in the direction of the interior of the container, wherein the detection device is arranged or formed at a distance from the front cover in the longitudinal direction. Preferably, the receiving device forms the second end at least partially. This embodiment is advantageous because the position of the receiving device defines a positioning of the holding device in the container, in particular in the safe, in particular key safe.

According to a further preferred embodiment of the present invention, the detection device is a Hall sensor. This embodiment is advantageous because it allows a magnetic field of a magnet arranged on the holding device or a magnetic field of a magnet provided as a component of the holding device to be detected and evaluated. Preferably, the magnet thereby forms at least partially and preferably for the majority or completely a counterpart to the holding area of the holding device.

According to a further preferred embodiment of the present invention, the Hall sensor generates a magnetic field signal and/or magnetic field data as a function of a detected magnetic field and transmits these to the processor device. The magnetic field signals and/or magnetic field data thereby preferably indicate whether the sensed magnetic field has defined properties or has properties that deviate from the defined properties. This embodiment is advantageous, since even greater safety can be achieved thereby. Preferably, several holding devices can have different magnetic properties, whereby in particular the magnetic field properties of a specific holding device or a specific group of holding devices can be stored.

According to another preferred embodiment of the present invention, the detection device is a directional antenna for receiving object signals and/or object data. The object signals and/or object data are preferably producible by an NFC tag, in particular an RFID tag, arranged on or generated in the holding device. This embodiment is advantageous because the object signals and/or object data can be different from holding device to holding device. Alternatively, however, it is also possible for different groups of holding devices, in particular for different devices and/or operators and/or companies, to generate different object signals and/or object data.

According to another preferred embodiment of the present invention, the directional antenna for receiving object signals and/or object data is oriented in the axial direction of the base body. This embodiment is advantageous because it allows an NFC tag, in particular an RFID tag, arranged in extension of the base body to be read very accurately on the holding device. Furthermore, fraud signals from outside the container cannot easily be fed to the directional antenna due to its positioning in the container.

According to a further preferred embodiment of the present invention, the near field data transmission device can be controlled by the processor device for transmitting object data, in particular when the processor device receives object data and/or object signals representing a defined holding device. Additionally or alternatively, the near-field data transmission device can be controlled to transmit object data when the processor device receives magnetic field signals and/or magnetic field data representing a defined magnetic field. This embodiment is advantageous, since preferably the near-field data transmission device is controlled only in the case of a correct or defined detection of signals and/or data, whereby in the case that the detected signals and/or data are not correct or do not sufficiently correspond to defined signals and/or data, the near-field data transmission device is not controlled. Thus, it is ensured that no object data and/or object signals and/or magnetic field signals and/or magnetic field data are transmitted which do not enable actuation of the actuator device. Thus, it is ensured that no additional power is consumed in this case.

According to a further preferred embodiment of the present invention, locking commands for locking the locking device are receivable from the near-field data transmission device in response to the object data or magnetic data transmitted by the near-field data transmission device, wherein the actuator is controllable by the processor device in dependence on the received locking commands for locking the locking device.

This embodiment is advantageous because the locking device can be transferred to a closed configuration as a function of the adjustment performed by the processor device.

Furthermore, the locking device according to the invention preferably has at least one sensor device for detecting at least one movement of the locking device and for generating sensor signals and/or sensor data as a function of the detected movement. Furthermore, the locking device according to the invention preferably comprises at least one power source other than a fixed power supply for operating at least the actuator, the near-field data transmission device, the memory unit (18), the processor device and/or the sensor device. The processor device preferably matches the sensor signals and/or sensor data of the sensor device with defined sensor signals and/or defined sensor data. The defined sensor signals and/or defined sensor data preferably represent a movement or a group of permissible movements and/or an impermissible movement or a group of impermissible movements. Preferably, an alarm function can be triggered by the processor device if the matching determines that the sensor signals and/or sensor data represent movements that deviate from permissible movements and/or that correspond to impermissible movements.

This solution is advantageous because it allows an impermissible actuation, in particular a break-in or vandalism, to be determined.

According to another preferred embodiment of the present invention, the impermissible movement or the group of impermissible movements represents vibrations or shocks resulting from an impact on the locking device by a tool, in particular a drill or a hammer or a chisel.

If, for example, a position sensor or a gyroscope is installed, the detection of an impermissible movement could consist of the electronic locking device detecting when, in a unit of time, the lock body is moved by an angle that cannot be realized without technical aids due to the anatomy of the human wrist. The same sensors can also be used, for example, to detect whether the lock body is being rotated very quickly or at a constant frequency. This could also indicate the use of technical aids. By means of built-in acceleration or shock sensors, the frequency and impulse of a movement can be used to draw conclusions about its permissibility. Strong impulses >>100N and a low frequency can indicate the use of a conventional hammer. Weaker pulses <100N at high frequency may indicate the use of a percussion drill.

According to another preferred embodiment of the present invention, an AI model for matching the sensor signals and/or sensor data of the sensor device with the defined sensor signals and/or defined sensor data is executable by the processor device.

It is suitable to use pre-trained AI models. For this purpose, acquired and recorded sensor data of locks are provided with the additional information whether an access attempt has actually taken place (possibly the type of access attempt), or not. To put it simply, an AI system now designs a model and trains it on the basis of the data presented. Ultimately, the trained AI system can recognize patterns in the captured data, particularly in the interaction of different sensors, which allow conclusions to be drawn as to whether an unauthorized access attempt is taking place. This pre-trained pattern recognition can then be loaded into the lock electronics and permanently evaluate the captured sensor data.

According to a further preferred embodiment of the present invention, the processor device can store the sensor signals and/or sensor data in the memory unit. Further data, in particular the time of the start of the sensor signal acquisition and/or sensor data acquisition and/or the end of the sensor signal acquisition and/or sensor data acquisition and/or the date, can preferably be acquired by the processor device and stored in the memory unit. This embodiment is advantageous because a very precise documentation of the unauthorized access can be made, whereby further security mechanisms become possible and/or criminal prosecution is possible.

According to another preferred embodiment of the present invention, a closure sensor, in particular a touch sensor or a light barrier, is provided for monitoring the closed configuration. Preferably, locking signals and/or locking data can be generated by the locking sensor, wherein the locking signals and/or locking data in a locking configuration represent the presence of the latch element in the locking position and/or wherein the locking signals and/or locking data in a manipulation configuration represent a position deviating from the locking position. In the locking position, the latch element is preferably arranged in an end position in the latch receptacle. In the manipulation configuration, the position of the latch element deviates from the locking position by at least a minimum amount. The minimum amount is thereby preferably greater than or equal to 0.01 mm or greater than or equal to 0.1 mm or greater than or equal to 0.5 mm or greater than or equal to 1 mm or greater than or equal to 2 mm or greater than or equal to 5 mm. This embodiment is advantageous because unauthorized access can be detected at a very early stage and countermeasures can thus be initiated at an early stage.

According to a further preferred embodiment of the present invention, the alarm function which can be triggered by the processor device can be used to control the actuator for transferring the latch element from the manipulation configuration to the locking configuration, in particular if a deviation from the locking configuration or a manipulation configuration can be determined by the locking sensor. This embodiment is advantageous because due to control of the actuator gaining unauthorized access is much more difficult.

Preferably, a latch element can be extended further from the actuator in the manipulation configuration than in a locking configuration.

According to a further preferred embodiment of the present invention, the sensor device comprises at least one acceleration sensor, wherein the acceleration sensor is configured to output acceleration signals and/or acceleration data as a function of forces introduced into the locking device, in particular during an unauthorized access. According to a further preferred embodiment of the present invention, the alarm function which can be triggered by the processor device can affect the output of an alarm signal or at least one alarm signal or more than one alarm signal, in particular via an optical and/or acoustic signal source of the electric locking device and/or of the container, as a function of the sensor signals and/or sensor data. This embodiment is advantageous, since a deterrence can be affected by the alarm signals. Furthermore, third parties can be informed of the unauthorized access by the alarm signals.

The above-mentioned object is also solved according to the invention by an opening device. The opening device is thereby preferably a locking door, a locking lid or a locking flap, for installation in a container at least comprising an electronic locking device described herein. This solution is advantageous because the opening device can be used to convert existing containers, in particular safes, such as key safes installed in a masonry wall, thus enabling the integration of the respective safe into a server-based system in a resource-saving manner. In particular, there is no need for costly removal of the safe body from the masonry and installation of a new safe body in the masonry.

According to the invention, the above-mentioned object is also solved by a container described herein. The container is thereby preferably a safe, in particular a key safe, and particularly preferably has an electronic locking device described herein or an opening device described herein.

The above-mentioned object is solved according to the invention by a method for retrofitting a container, in particular a safe, which can be locked with a physical key, to a container, in particular a safe, which is equipped with electrical components. Preferably, the method according to the invention comprises at least the following steps:

Removing an opening device, namely a closure door, a closure lid or a closure flap, from the container, wherein the opening device preferably comprises a lock mechanism, wherein the lock mechanism can be transferred from a closed configuration to an open configuration by means of the physical key, and wherein the lock mechanism can be transferred from the open configuration to the closed configuration by means of the physical key. Inserting a positioning mask into the container, wherein an NFC tag, in particular RFID tag, is arranged on the positioning mask, wherein the NFC tag, in particular RFID tag, is positioned by the positioning mask at a predefined location in the container. Positioning the NFC tag, in particular RFID tag, in the container at the predefined location and arranging a locking device on the container, wherein the locking device is preferably and/or at least comprises a locking device described herein and/or at least comprises: at least one electrically operable actuator for transferring the electric locking device from a closed configuration to an open configuration, the actuator being operable to move at least one latch element of a latch receptacle to an area outside the latch receptacle or for transferring the electric locking device from an open configuration into a closed configuration, it being possible for the actuator to cause the at least one latch element of the latch device to be moved from the region outside the latch receptacle into the latch receptacle. Furthermore, the locking device according to the invention preferably has a near-field data transmission device for receiving data from at least one mobile terminal temporarily located in a defined distance range from the electronic locking device and for transmitting data, in particular access data, to the at least one mobile terminal temporarily located in a defined distance range from the electronic locking device, the near-field data transmission device having at least one near-field data transmission antenna for receiving and/or transmitting the data. Furthermore, the Locking device according to the invention preferably comprises a memory unit for at least temporarily storing time data and/or access data. The time data preferably have at least data on the last opening time (reaching the opened configuration) and/or at least data on the last closing time (reaching the closed configuration). The access data preferably have at least authorization data and identification data. The authorization data preferably define in dependence of which identification data the actuator transfers the locking device from the closed configuration to the open configuration. The identification data preferably specify an assignment to the mobile terminal. Preferably, the locking device according to the invention comprises a processor device for matching the authorization data and the identification data. Preferably, the actuator can be actuated by the processor device to open the locking device in the event of a positive match, wherein a positive match represents a defined match of the matched data. Preferably, at least one power source other than a fixed power supply is provided for operating at least the actuator, the near field data transmission device, the memory unit and/or the processor device. The power source may additionally or alternatively serve to operate the sensor device and/or the detection device.

Preferably, the locking device comprises at least one directional antenna, wherein the directional antenna is provided for data and/or signal exchange with the preferably passive NFC tag, in particular RFID tag, wherein the directional antenna is connected to the processor device, wherein data and/or signals from the NFC tag, in particular RFID tag, can be fed to the processor device via the directional antenna up to a maximum distance between the NFC tag, in particular RFID tag, and the directional antenna, wherein the maximum distance is less than 10 mm, wherein the data and/or signals from the NFC tag, in particular RFID tag, represent at least position signals and/or position data, wherein a target orientation of the locking device is represented by the position signals and/or position data, and/or wherein the data and/or signals from the NFC tag, in particular RFID tag, represent at least installation data, wherein an assignment of the locking device to the NFC tag, in particular RFID tag, can be evaluated by the installation data.

The above-mentioned object is also solved according to the invention by a method for actuating an electronic locking device, in particular for retrofitting a container, or a container with an electric locking device. The method according to the invention preferably comprises at least the steps of:

Providing an electronic locking device described herein, Providing a mobile terminal, said mobile terminal comprising near-field data transmission means for exchanging data with the near-field data transmission means of the container, said mobile terminal comprising far-field data transmission means, in particular LTE, for exchanging data with a server device, said mobile terminal comprising a processor unit for executing a control application, said mobile terminal comprising memory device for storing lock reconfiguration data and lock operation data. The lock operation data is preferably transmitted to the near-field data transmission means of the mobile terminal by the near-field data transmission device for forwarding to the server device. The mobile terminal preferably receives the lock reconfiguration data from the server device via the far-field data transmission means. The lock reconfiguration data is preferably generated in response to the lock operation data transmitted to the server device by means of the near-field data transmission means. The lock operation data preferably has at least time data and access data. Further, the method according to the invention preferably comprises the step of inserting the holding device into the receiving means. Furthermore, the method according to the invention preferably comprises the step of detecting the presence of the holding device in the receiving device. Furthermore, the method according to the invention preferably comprises the step of outputting object signals and/or object data. The object signals and/or object data preferably represent the presence of the holding device in the receiving device, and preferably the object signals and/or object data additionally or alternatively represent object identification signals and/or object identification data, wherein a defined holding device or a defined group of holding devices is represented by the object identification signals and/or object identification data. Furthermore, the method according to the invention preferably comprises the step of transmitting object signals and/or object data by the near field data transmission device to the near field data transmission means, in particular when the processor device receives object signals and/or object data representing a presence of the holding device in the receiving device. Furthermore, the method according to the invention preferably comprises the step of transmitting locking commands for locking the locking device by the near-field data transmission means to the near-field data transmission device. Preferably, the actuator is controlled by the processor device in response to the received locking commands for locking the locking device.

The object signals and/or object data can be matched with object reference data, for example, in the locking device and/or in the mobile terminal and/or by a server device. If the matching takes place in the locking device and/or in the mobile terminal, then the matching result can be transmitted to the server device. In case of a positive matching, i.e. a sufficient match, locking commands for locking the locking device are preferably transmitted to the processor device, in particular by the server device and/or by the mobile terminal. Alternatively, it is also possible that only the information that the specific lock is closed or locked is stored on the mobile terminal and/or the server device.

The above-mentioned object is further solved by a method for operating an electronic locking device, in particular for retrofitting a container, in particular a locking device described herein, or a container with an electric locking device, a locking device described herein. The method preferably comprises at least the following steps:

Providing an electronic locking device described herein,

Providing a mobile terminal, wherein the mobile terminal comprises near field data transmission means for data exchange with the near field data transmission device of the container, wherein the mobile terminal preferably comprises far field data transmission means, in particular LTE, for data exchange with a server device, and wherein the mobile terminal preferably comprises a processor unit for executing a control application. The mobile terminal preferably has a memory unit for storing lock reconfiguration data and lock operation data.

Preferably, the lock operation data is transmitted to the near-field data transmission means of the mobile terminal by the near-field data transmission means for transmission to the server device. Preferably, the mobile terminal receives the lock reconfiguration data from the server device via the far-field data transmission means. The lock reconfiguration data is particularly preferably generated in response to the lock operation data transmitted to the server device by means of the near-field data transmission means. The lock operation data preferably comprises at least time data and access data. Further, the method preferably comprises the step of manually moving at least a part of the locking device until signals and/or data are transmitted from the NFC tag, in particular RFID tag, to the processor device via the directional antenna. Further, the method preferably comprises the step of transmitting target position data by the near field data transmission device to the near field data transmission means, in particular when the processor device receives position signals and/or position data representing a target orientation of the locking device. Furthermore, the method preferably comprises the step of transmitting locking commands for locking the locking device by the near-field data transmission means to the near-field data transmission device, wherein the actuator is preferably controlled by the processor device in dependence on the received locking commands for locking the locking device.

The target position data can be matched with target position reference data, for example, in the locking device and/or in the mobile terminal and/or by a server device. If the matching takes place in the locking device and/or in the mobile terminal, then the matching result can be transmitted to the server device. In case of a positive matching, i.e. a sufficient match, locking commands for locking the locking device are preferably transmitted to the processor device, in particular by the server device and/or by the mobile terminal.

Furthermore, the above-mentioned object is solved by a method for converting a container, in particular a safe, which can be locked with a physical key, to a container, in particular a safe, which is equipped with electrical components. This method preferably comprises at least the following steps:

Removing an opening device namely a locking door, a locking lid or a locking flap from the container, wherein the opening device preferably comprises a lock mechanism, wherein the lock mechanism can be transferred from a closed configuration to an open configuration with the physical key and wherein the lock mechanism can be transferred from the open configuration to the closed configuration with the physical key, inserting a positioning mask into the container, wherein an NFC tag, in particular RFID tag, is arranged on the positioning mask, wherein the NFC tag, in particular RFID tag, is positioned by the positioning mask at a predefined location in the container, attaching the NFC tag, in particular RFID tag, in the container at the predefined location, arranging a locking device described herein on the container. In particular, a locking device which comprises:

According to the invention, the above-mentioned object is also solved by a method for actuating an electronic locking device, in particular for retrofitting a container or a container with an electric locking device, in particular a locking device described herein. The method thereby preferably comprises at least the following steps: Providing an electronic locking device described herein, providing a mobile terminal, said mobile terminal comprising near-field data transmission means for exchanging data with the near-field data transmission device of the container, said mobile terminal comprising far-field data transmission means, in particular LTE, for exchanging data with a server device, said mobile terminal comprising a processor unit for executing a control application, said mobile terminal comprising memory device for storing lock reconfiguration data and lock operation data, wherein the lock operation data is transmitted to the near field data transmission means of the mobile terminal by the near field data transmission device for forwarding to the server device, and wherein the mobile terminal receives the lock reconfiguration data from the server device via the far field data transmission means, the lock reconfiguration data being generated in response to the lock operation data transmitted to the server device by the near field data transmission means, the lock operation data comprising at least time data and access data. Further preferably comprising the steps of: Manually moving at least a part of the locking device, activating the near field data transmission device as a result of manually moving the locking device, establishing a data connection between the near field data transmission device and the near field data transmission means.

The above object is also solved by a method for operating an electronic locking device described herein, in particular for retrofitting a container, or for operating an electric locking device of a container described herein. The method preferably comprises at least the following steps: Providing an electronic locking device described herein, Providing a mobile terminal, the mobile terminal preferably comprising a near field data transmission means for data exchange with the near field data transmission means of the container, the mobile terminal preferably comprising a far field data transmission means, in particular LTE, for data exchange with a server device, the mobile terminal comprising a processor unit for executing a control application, the mobile terminal comprising a memory device, in particular for storing lock reconfiguration data and lock operation data. The lock operation data is preferably transmitted to the near-field data transmission means of the mobile terminal by the near-field data transmission device for forwarding to the server device. The mobile terminal preferably receives the lock reconfiguration data from the server device via the far-field data transmission means. The lock reconfiguration data is preferably generated in response to the lock operation data transmitted to the server device by means of the near-field data transmission means. The lock operation data preferably comprises at least time data and access data. Further, the method preferably comprises the step of detecting movements of the electric locking device by the sensor means. Further, the method preferably comprises the step of outputting sensor signals and/or sensor data, the sensor signals and/or sensor data representing the movements. Further, the method preferably comprises the step of analyzing the sensor signals and/or sensor data. Furthermore, the method preferably comprises the step of triggering an alarm function.

According to a preferred embodiment of the present invention, identification data provided by the server device is provided in the memory device of the mobile terminal, wherein the identification data is transmitted to the mobile terminal together with or with the lock reconfiguration data or as a separate data set. Preferably, the identification data is transmitted together with specific device data of the mobile terminal as a result of an access authorization request by means of the near field data transmission means to the near field data transmission device. Preferably, at least the identification data is stored in the memory unit and matched with authorization data present in the memory unit. Depending on a matching result resulting from the matching, it is preferably determined whether the locking device remains in a locked state or is transferred to an open state.

A specific set of lock operation data is preferably held in modified form in the memory unit by the processor device of the locking device, in particular at least after this set of lock operation data has been transmitted to the mobile terminal.

The lock reconfiguration data of the processor device of the locking device preferably specify which data, in particular which specific set of lock data, is deleted from the memory unit. The processor device of the locking device preferably deletes the data from the memory unit in dependence on the lock reconfiguration data.

The lock reconfiguration data preferably comprises authorization data. In addition, the lock reconfiguration data preferably has an instruction to the processor device of the locking device to replace and/or extend the authorization data held in the memory unit by the authorization data of the lock reconfiguration data.

Further, the above object is solved by a computer program product for carrying out a method described herein.

Additionally, the above object is solved by a system. The system preferably comprises at least a plurality of locking devices described herein. Furthermore, the system according to the invention preferably comprises a plurality of mobile terminals, each mobile terminal comprising a near field data transmission means for exchanging data with the near field data transmission device of the locking devices. Preferably, each mobile terminal additionally has a far-field data transmission means, in particular LTE, for data exchange with a server device. Furthermore, each mobile terminal preferably has a processor unit for executing a control application and a storage device for storing lock reconfiguration data and lock operation data. The lock operation data is preferably transmitted by the near-field data transmission device to the near-field data transmission means of the respective mobile terminal for forwarding to the server device. The lock operation data preferably has at least time data and access data. The time data preferably has at least data on the last opening time and/or at least data on the last closing time. Furthermore, the system preferably comprises at least one server device, in particular a cloud server device. The server device preferably receives the lock operation data from the respective mobile terminal and particularly preferably generates lock reconfiguration data after receiving the lock operation data. Further, the server device preferably sends it to the mobile terminal from which it received the lock operation data or to another mobile terminal associated with the locking device or to a group of mobile terminals, wherein all mobile terminals associated with the group are associated with the locking device.

Further advantages, objectives and features of the present invention will be explained with reference to the following description of accompanying drawings, in which the devices, methods and systems according to the invention may be illustrated by way of example. Components or elements which are preferably used in the devices, methods and systems according to the invention and/or which at least substantially correspond with respect to their function in the figures may be marked here with the same reference signs, whereby these components or elements need not be numbered or explained in all figures.

Figure 2:
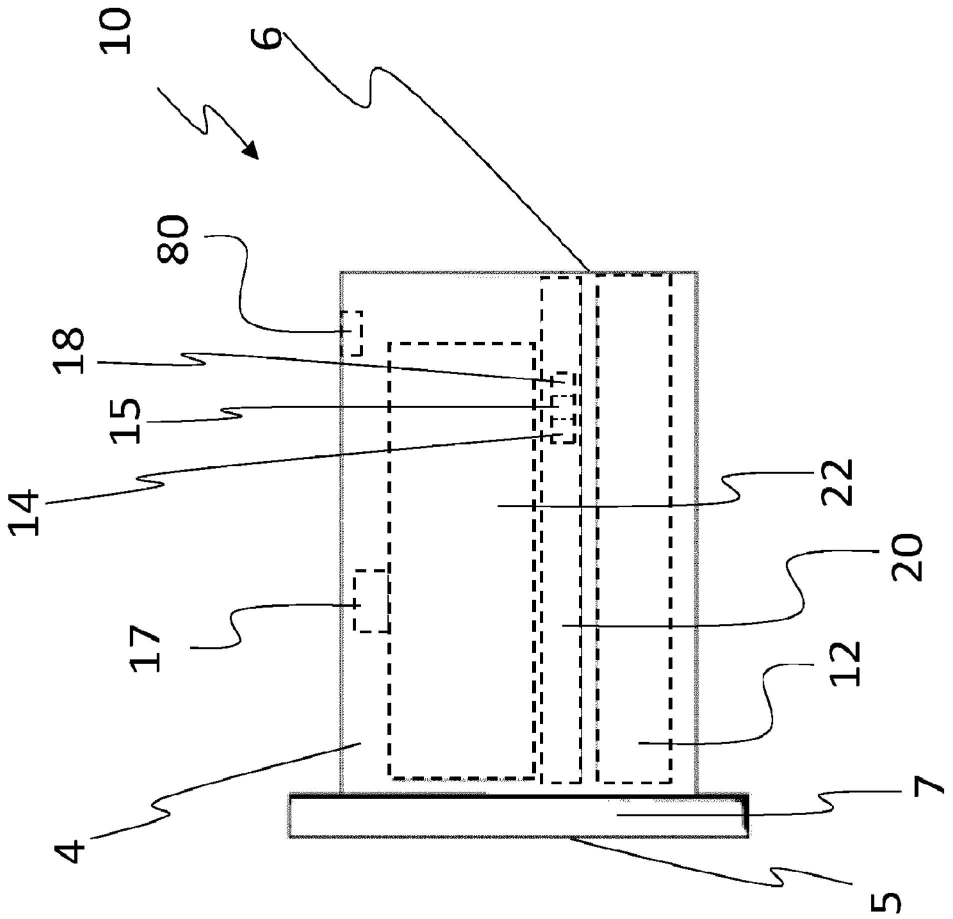
Figure 3B:
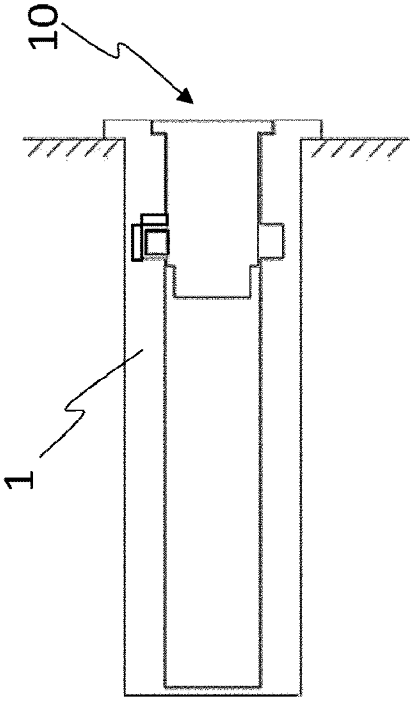
Figure 3D:
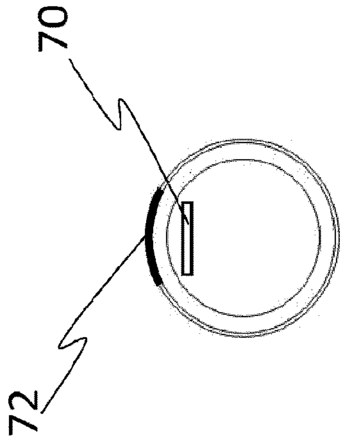
Figure 3A:
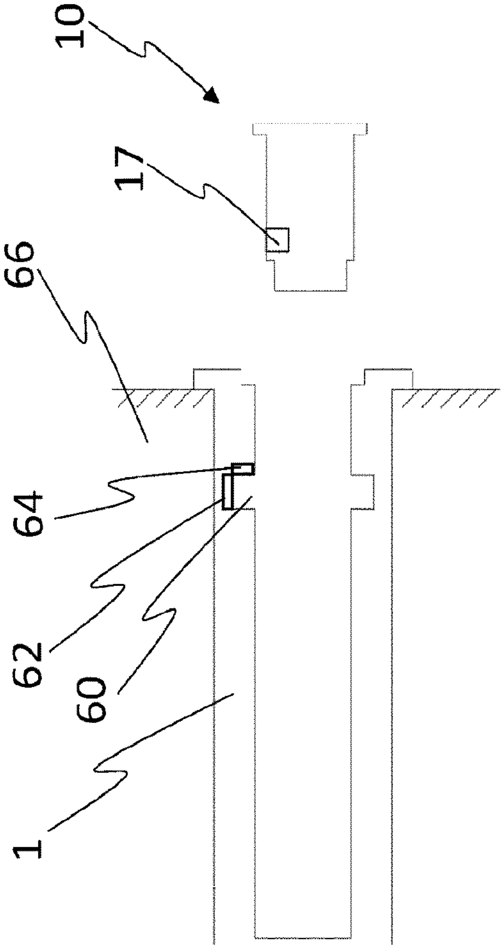
Figure 3C:
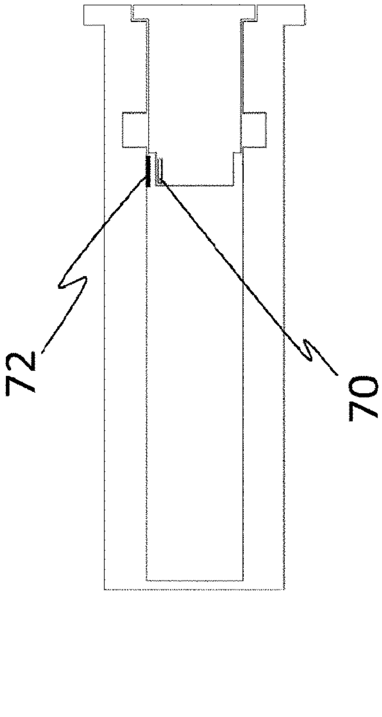
Figure 4:
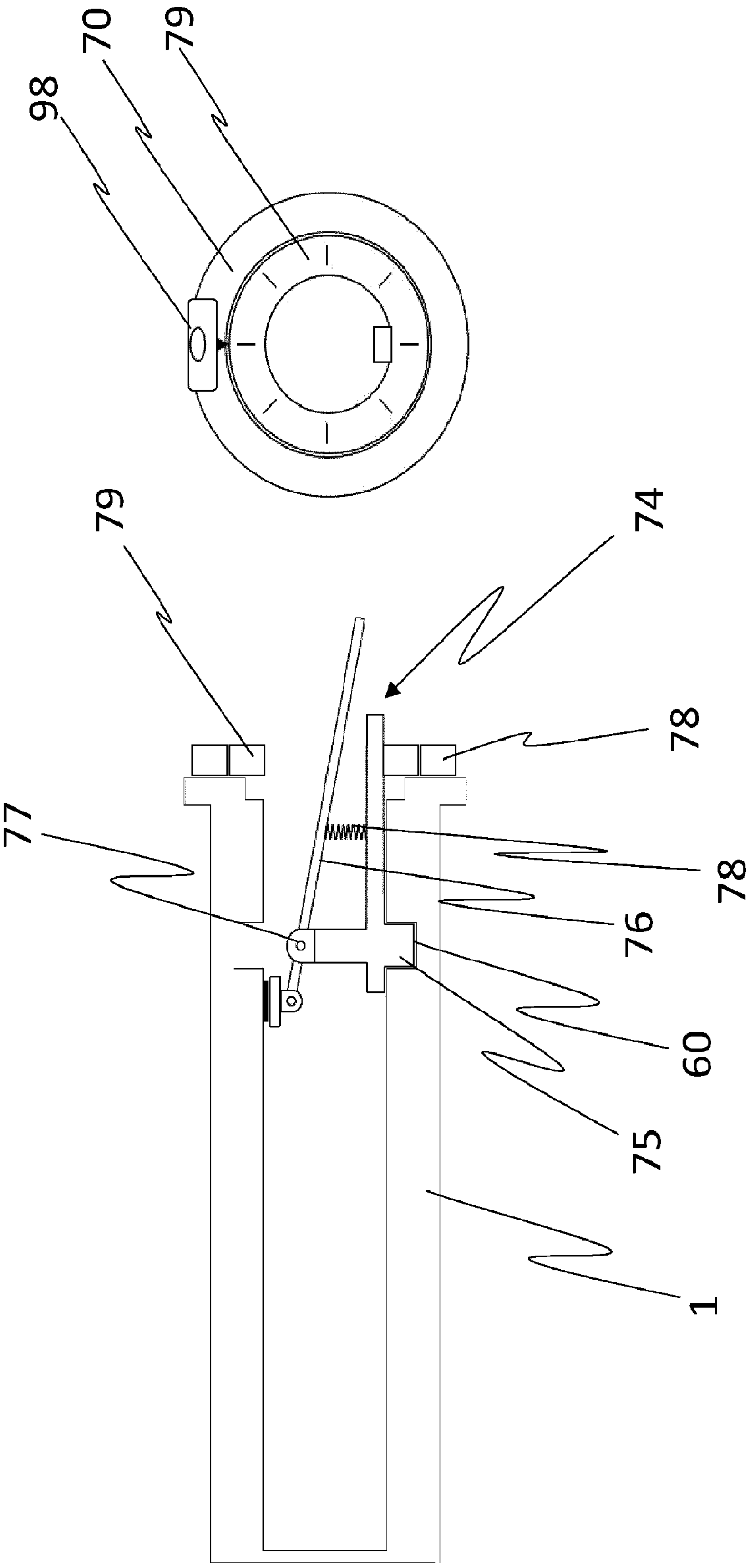
Figure 5:
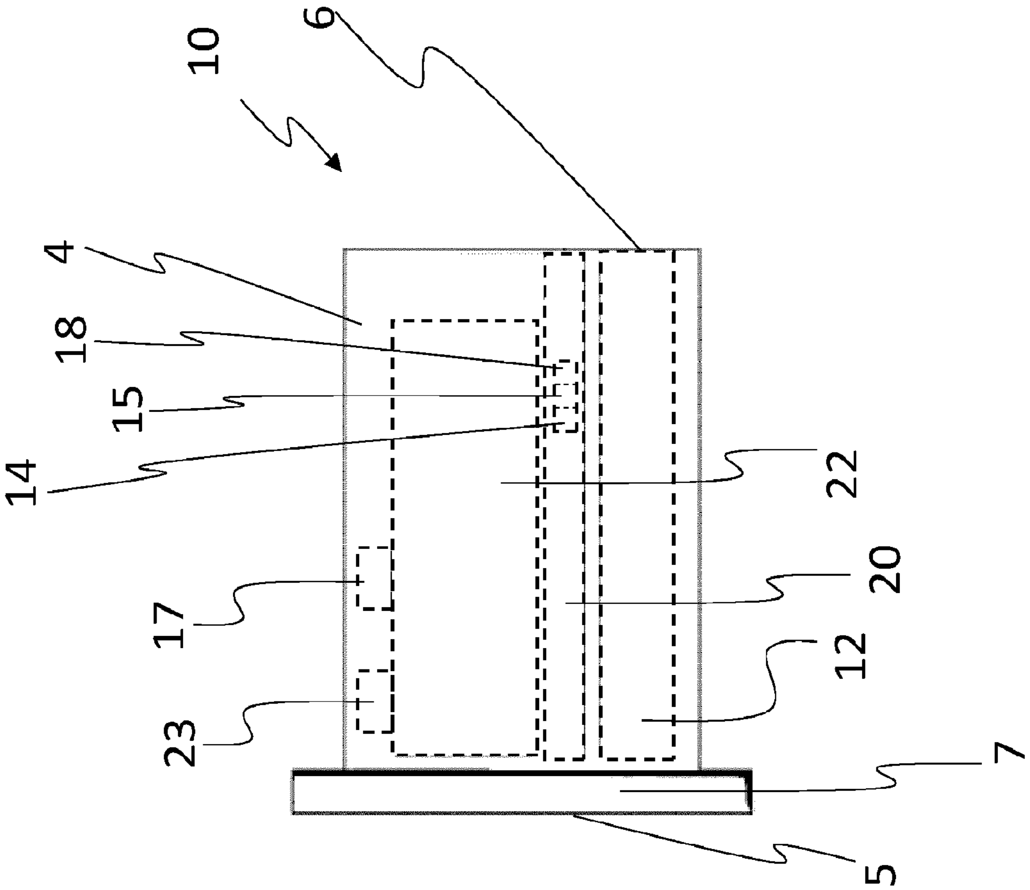
Figure 6:
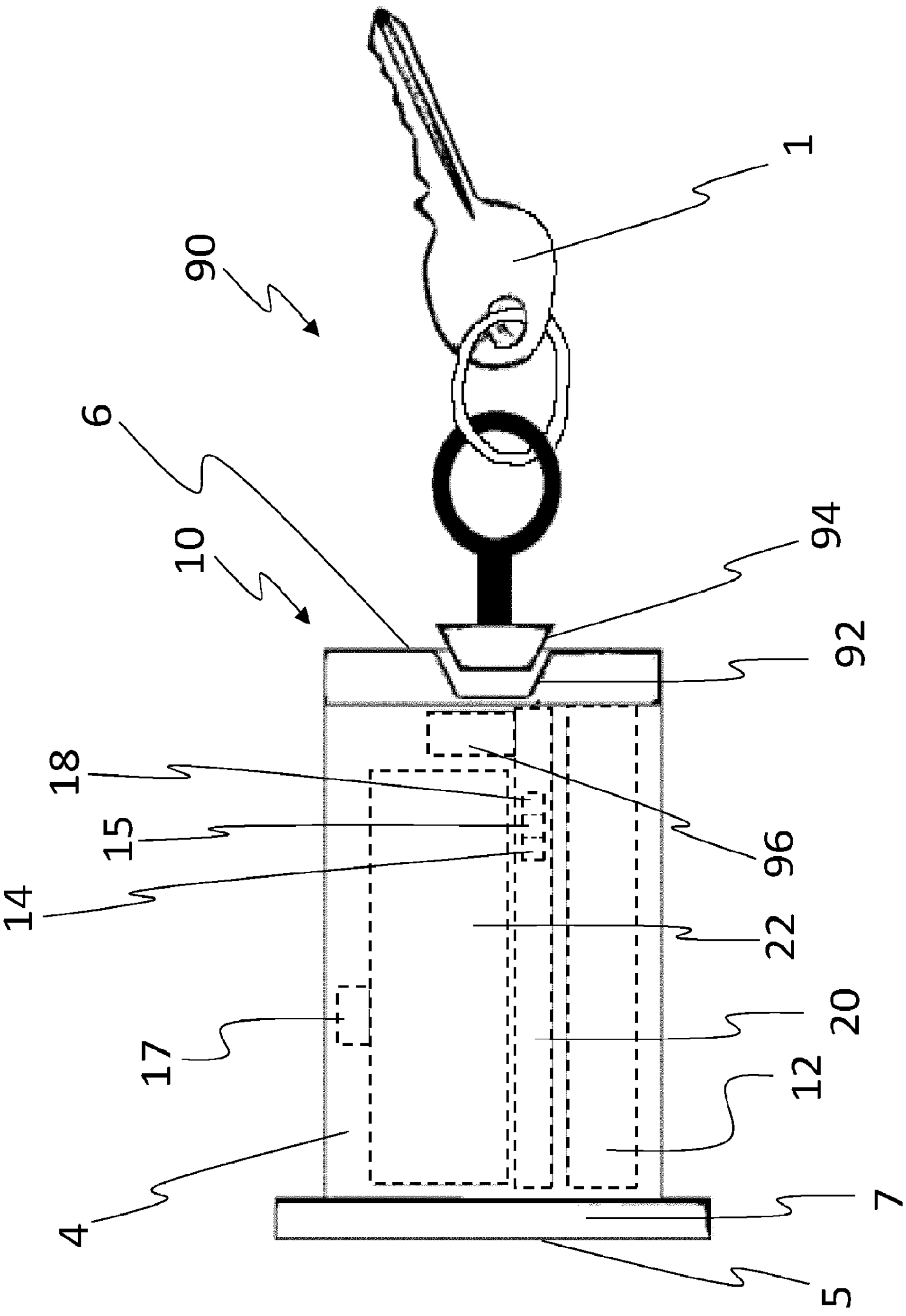
Figure 7:
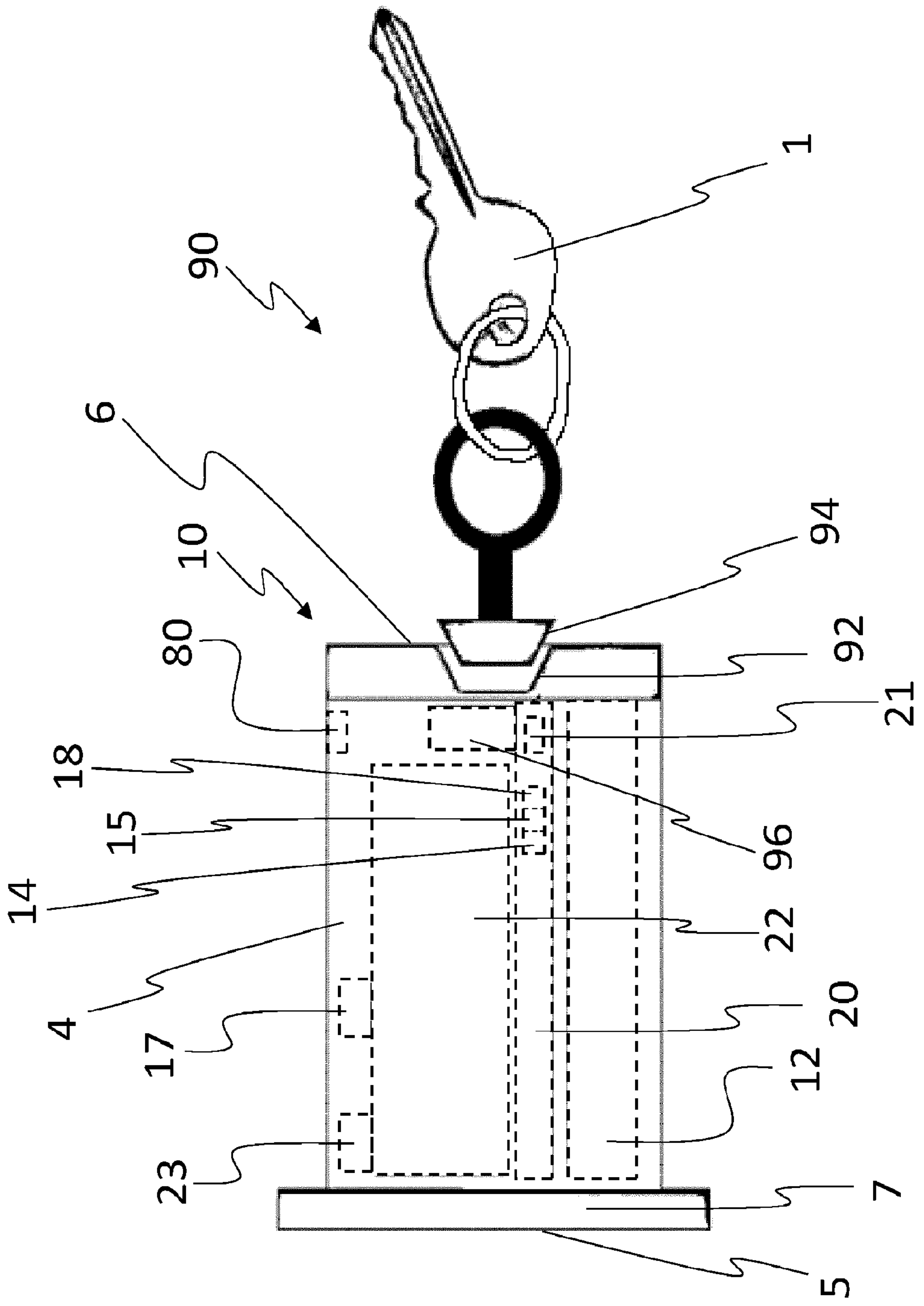
Figure 8:
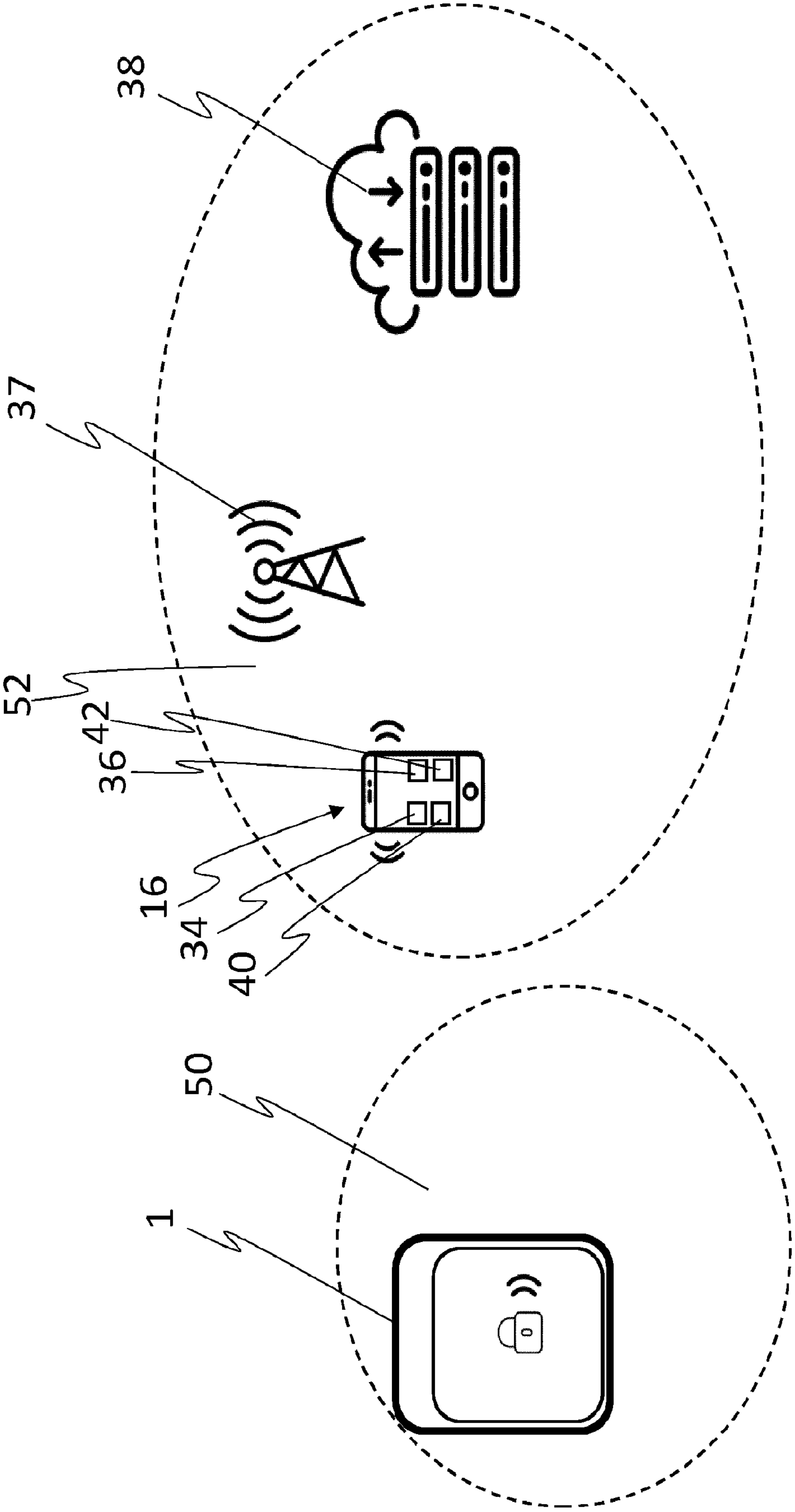
Figure 10:
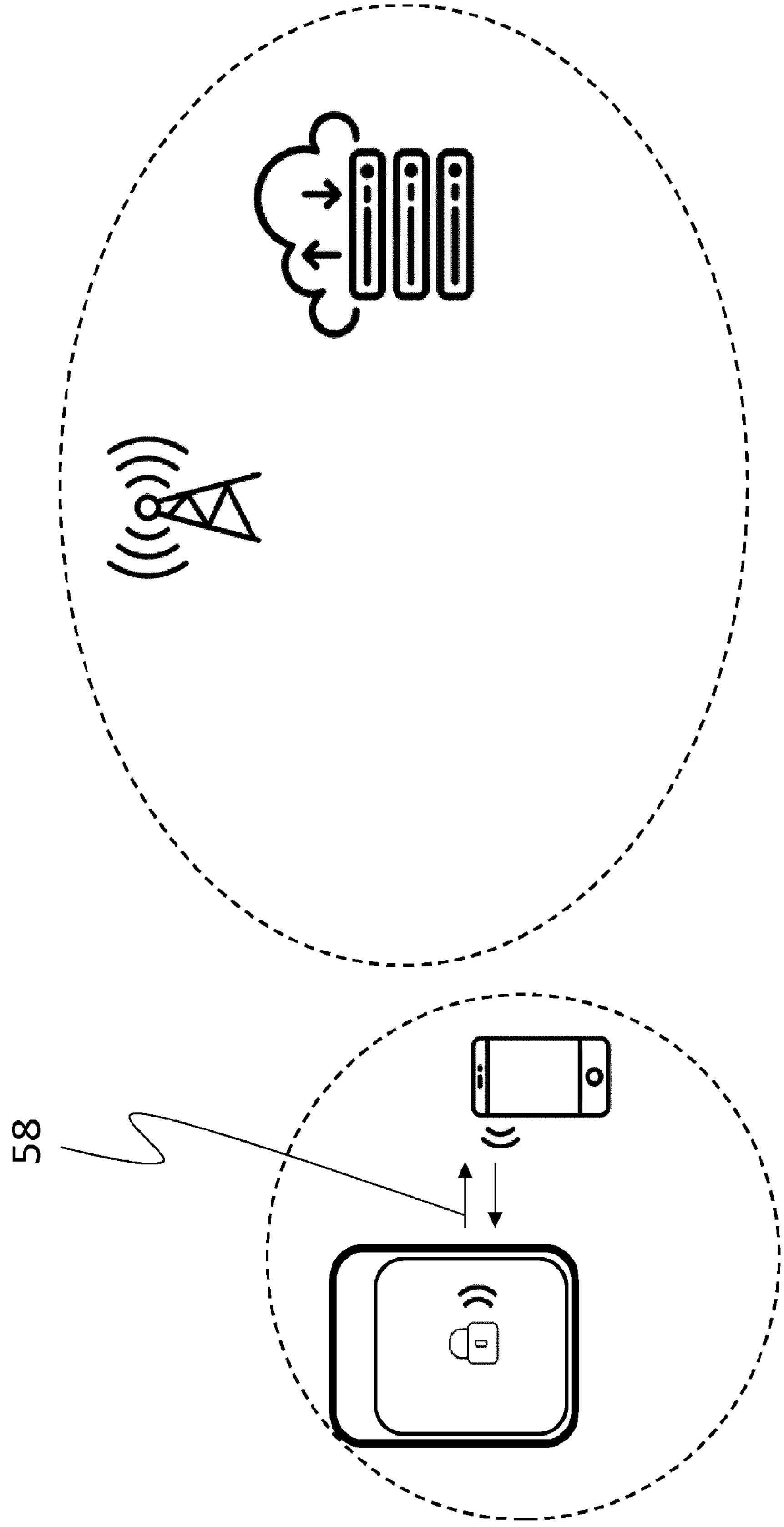
Figure 11:
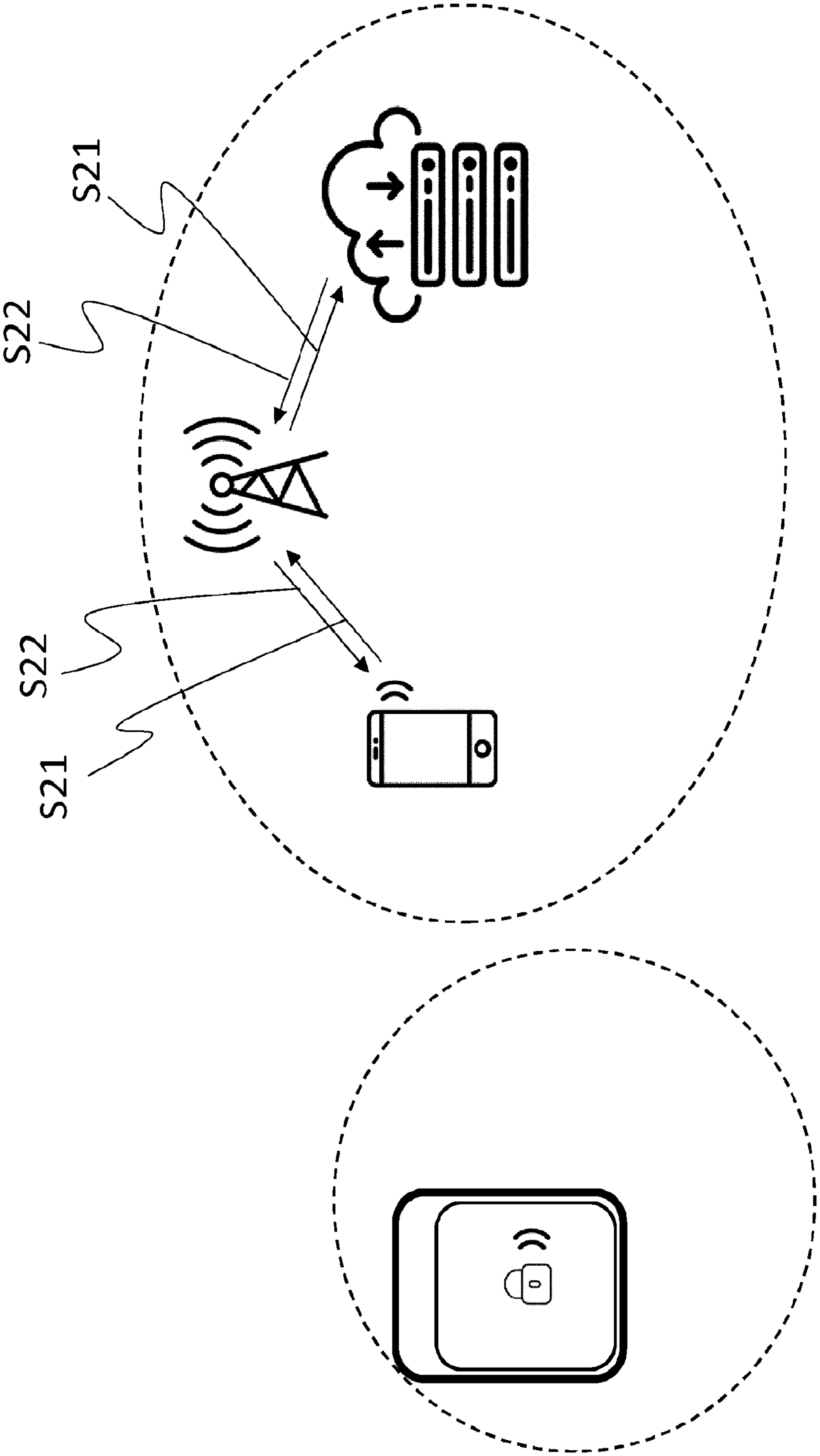
Figure 12:
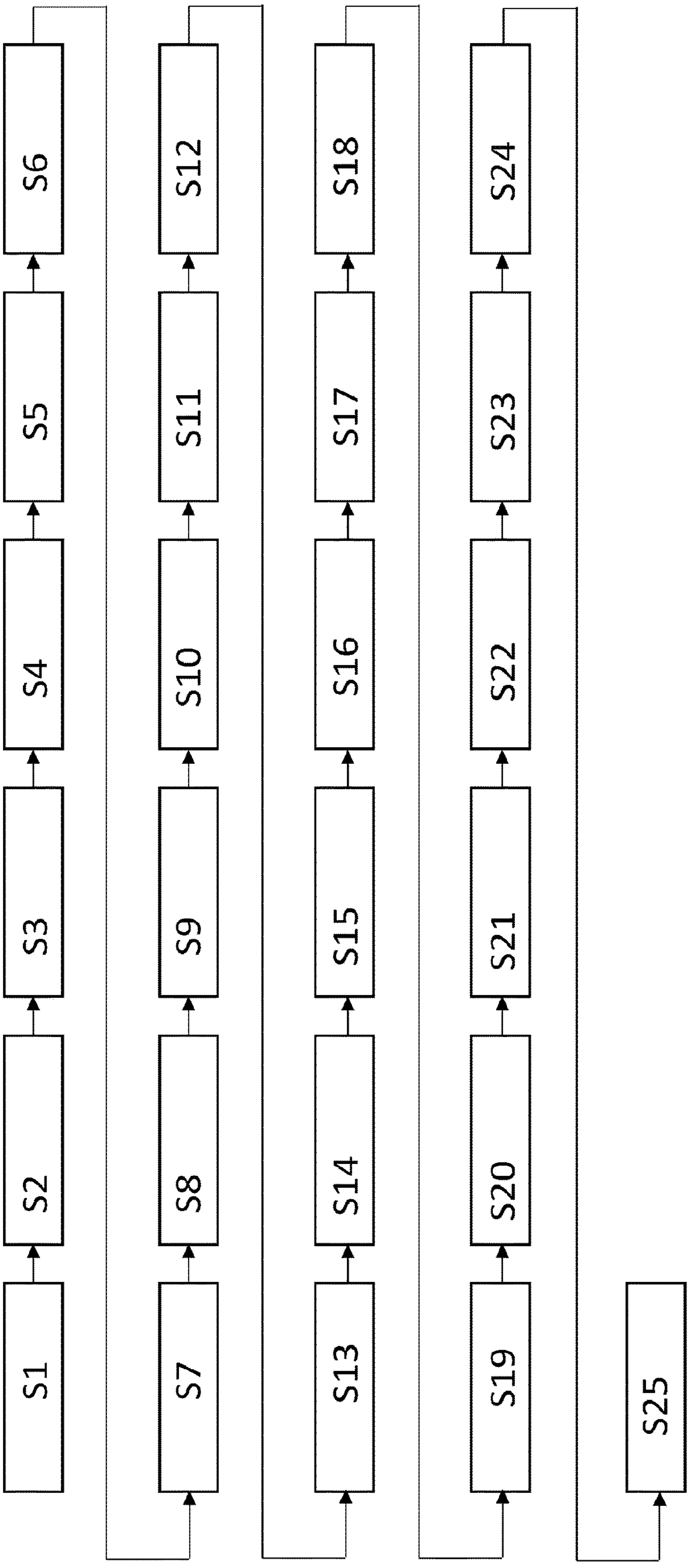

Therein show:

FIG. 1 a first schematic example of an electric Locking device according to the invention;

FIG. 2 a second schematic example of an electric locking device according to the invention;

FIG. 3*a*-3*c* schematic sectional views illustrating the installation of an electric locking device in a container, in particular in a key safe, FIG. 4 schematic illustration of an installation device for positioning an NFC tag in the container, in particular the key safe, FIG. 5 a third schematic example of an electric locking device according to the invention;

FIG. 6 a fourth schematic example of an electric locking device according to the invention;

FIG. 7 a fifth schematic example of an electric locking device according to the invention;

FIGS. 8 to 11, purely schematically, an example of data transmission according to the device(s), methods or system (s) according to the invention; and FIG. 12 purely exemplary of a preferred process sequence according to the present invention, wherein individual or several of the steps shown may not be carried out or may be carried out in a different sequence or may be carried out several times.

Referring to FIG. 1, an exemplary example of a locking device 10 according to the present invention is shown.

The electric locking device 10 shown here has an electrically operable actuator 12 for transferring the electric locking device 10 from a closed configuration to an open configuration. It is causable by the actuator 12 to move at least one latch element 17 of a latch device from a latch receptacle (on the locking device side) to an area outside the latch receptacle. Alternatively, the actuator can be provided for transferring the electric locking device 10 from an open configuration to a closed configuration. It is causable by the actuator 12 that the at least one latch element 17 of the latch device is moved from the area outside the latch receptacle, in particular from the latch element receptacle 60 (on the container side), into the latch receptacle (on the locking device side). Furthermore, the locking device 10 has a near-field data transmission device 14 (and an antenna 15 connected thereto) for receiving data from at least one mobile terminal 16 temporarily located within a defined distance range from the electronic locking device 10 and for transmitting data, in particular access data, to the at least one mobile terminal 16 temporarily located within a defined distance range from the electronic locking device 10. The reference sign 18 indicates a memory unit for at least temporarily storing time data and/or access data and/or data of a sensor device and/or detection device. The time data comprise at least data on the last opening time (reaching the opened configuration) and/or at least data on the last closing time (reaching the closed configuration). The access data have at least authorization data and identification data. The authorization data define in dependence on which identification data the actuator 12 transfers the locking device 10 from the closed configuration to the open configuration, and the identification data provide an assignment to the mobile terminal 16. Furthermore, a processor device 20 is provided for matching the authorization data and the identification data. The actuator 12 is controllable by the processor device 20 to open the locking device 10 in case of a positive matching, wherein a positive matching preferably represents a defined match of the matched data. The actuator 12 is controllable by the processor device 20 for opening the locking device 10 in case of a positive matching, wherein a positive matching represents a defined matching of the matched data. The reference sign 23 indicates at least one sensor device for detecting at least one movement of the locking device 10 and for generating sensor signals and/or sensor data as a function of the detected movement. Further, the locking device 10 comprises at least one power source 22 other than a fixed power supply for operating at least the actuator 12, the near-field data transmission device 14, the memory unit 18, the processor device 20 and/or the sensor device. Further, at least one control device 21 for activating one or more devices deactivated in an idle state, wherein the device deactivated in the idle state is at least one or more of the following: The actuator 12, the near field data transmission device 14, the memory unit 18 and/or the processor device 20. The control device 21 is connected to the sensor device 23 at least via a signal and/or data connection, wherein sensor data or sensor signals generated by the sensor device 23 can be transmitted to the control device 21 via the signal and/or data connection. At least one deactivated device can be activated by the control device 21 as a function of the sensor data or sensor signals.

At least the actuator 12 and the near-field data transmission device 14 are deactivated in the idle state, preferably at least the actuator 12, the near-field data transmission device 14 and the memory unit 18 are deactivated in the idle state.

The electric locking device has an elongated base body 4, the elongated base body 4 having a first end 5 and a second end 6 spaced from the first end 5 in the longitudinal direction of the base body 4, the first end 5 having an actuating device for moving the base body 4, wherein the actuator 12, the near-field data transmission device 14, the memory unit 18, the processor device 20, the energy source 22, the control device 21, the sensor device 23 and a latch device 17, in particular a latch element, movable by the actuator 12 are arranged at a distance from the actuating device in the longitudinal direction. The actuator 12, the near-field data transmission device 14, the memory unit 18, the processor device 20, the sensor device 23 and the energy source 22 are at least indirectly, and preferably directly, connected to the base body 4, in particular these devices together form a common assembly. Preferably, at least one latch element 17 of the latch device is provided in the region of the first end 5 of the base body 4, in particular closer spaced from the first end 5 than from the second end 6 of the base body 4. The base body 4 has a front cover 7 for covering a container 1, in particular a safe. The actuating device is designed for manually applying forces to the base body 4 for moving the base body 4 relative to the environment. The sensor device 23 has at least one acceleration sensor. The acceleration sensor is designed to output acceleration signals and/or acceleration data as a function of forces introduced via the actuating device. The actuating device is of plate-like design, in particular flat and with roughness RA<25 μm, and is preferably used for manually initiating knocking pulses.

The control device 21 is configured to activate one or more or all of the deactivated devices in response to a predetermined code. The code comprises at least a sequence of acceleration signals and/or acceleration data, wherein acceleration signals and/or acceleration data output by the acceleration sensor can be evaluated by the control device 21 for checking the code.

The sensor device 23 may alternatively or additionally comprise at least one position sensor, in particular a gyroscope, for detecting one or more rotational movements of the base body 4. The actuating device comprises at least one lever element (not shown) for at least partial rotation of the base body 4 and is preferably used for manually initiating rotational movements.

The control device 21 is configured for activating one or more or all of the deactivated device in response to a predetermined code. The code consists at least of a sequence of position signals and/or position data, wherein position signals and/or position data output by the position sensor can be evaluated by the control device 21 for checking the code. As a result of checking the code, the control device 21 can activate the near-field data transmission device 14 or cause it to be activated. Signals and/or data for opening the locking device 10 can be received by means of the near-field data transmission device 14, the near-field data transmission device 14 being designed for transmitting and receiving signals and/or data by radio, in particular Bluetooth, WLAN, ZigBee or NFC.

The basis for this solution consists of a battery-powered electronic lock. In the present case, the entire electronics together with the battery are preferably integrated into the locking cap, thereby forming the electric locking device 10 according to the invention.

A significant advantage of this solution is that a battery life of the electronic lock or locking device 10 of 10 years or more can be achieved. This is done by deactivating or putting into "deep sleep" a large number of components, thus deactivating all non-essential functions, in order to realize a power consumption in the nA range. Here we have to actively wake up the lock if we want to communicate with it. This results in the need to actively "wake up" the locking device 10.

For security reasons, the locking device 10 preferably does not have a push button or switch in the front panel, since such an element can always be the target of burglary attempts or simply vandalism. And if the switch or push-button is destroyed, then the lock or locking device 10 can no longer be opened because it cannot be woken up.

For this reason, several technologies, in particular two or more than two different technologies, may be integrated in the locking device 10 to wake the locking device 10 from a deep sleep. With each of the technologies it is preferably possible to wake up the locking device 10. One of the differences here, however, is that only with one solution is it possible to have a locking device 10 with a completely flat front panel 7, whereas with another solution at least a small handle is provided on the front panel 7.

The first solution consists of an acceleration sensor, or shock sensor, integrated in the locking cap. With this it is possible to give the lock a signal to wake up by knocking on the locking cap-analogous to knocking on a door. It is also conceivable that a certain sequence has to be knocked (a kind of coding) so that the lock wakes up from deep sleep.

For the second solution, a sensor is provided for position detection. This can be used to determine whether the locking device 10 is rotated in the cylinder or container 1. To wake up the locking device 10, it can be turned 45 degrees to the left or right, for example, by a small handle on the front panel. Again, if necessary, a coded sequence can be evaluated to wake up the locking device 10.

As soon as the locking device 10 has been woken up in one way or another, the electronics start and after a few milliseconds a connection can be established with the locking device (and a mobile terminal 16), for example, by means of near-field radio, or the latter can be given a signal to open. If the locking device 10 cannot or should not be opened by means of near-field radio, in particular a near-field data transmission device, access codes can also be "morsed" using the codes described above or a code can be entered via an actuating device (handle or front panel) similar to a safe rotary lock using "left, center, right" positions.

Additionally or alternatively, a detection device 96 can preferably also be supplied with energy from the energy source 22, in particular at least temporarily.

Preferably, a receiving device 92 can be provided for receiving at least one holding device 90 for holding at least one object 2, in particular at least one mechanical key. Furthermore, the at least one detection device 96 may be provided for detecting the presence of the at least one holding device 90 in or on the receiving device 92 and for generating detection signals and/or detection data depending on the detected presence. (cf. FIG. 6 or FIG. 7)

Additionally or alternatively, at least one directional antenna 70 is provided, wherein the directional antenna 70 is provided for transmitting energy/data and/or signals to a preferably passive NFC tag 72, in particular RFID tag, and/or for receiving energy/data and/or signals from the RFID tag. The directional antenna 70 is preferably connected to the processor device 20, wherein data and/or signals from the NFC tag 72, in particular RFID tag, can be fed to the processor device 20 via the directional antenna 70 up to a maximum distance between the NFC tag, in particular RFID tag, and the directional antenna 70. The maximum distance is preferably less than 30 mm, in particular less than 20 mm or less than 10 mm, wherein the data and/or signals from the NFC tag 72, in particular RFID tag, represent at least position signals and/or position data, wherein a target orientation of the locking device 10 is represented by the position signals and/or position data, and/or wherein the data and/or signals from the NFC tag 72, in particular RFID tag, represent at least installation data, wherein an assignment of the locking device 10 to the NFC tag 72, in particular RFID tag, can be evaluated by the installation data. (cf. FIG. 2 or FIG. 7)

Additionally or alternatively, the processor device 20 matches the sensor signals and/or sensor data of the sensor device 23 with defined sensor signals and/or defined sensor data, wherein the defined sensor signals and/or defined sensor data represent a movement or a group of permissible movements and/or an impermissible movement or a group of impermissible movements, wherein an alarm function can be triggered by the processor device 20 if it is determined by the matching that the sensor signals and/or sensor data represent movements that deviate from permissible movements and/or that correspond to impermissible movements. (cf. FIG. 5 and FIG. 7)

Referring to FIG. 2, another exemplary example of a locking device 10 according to the invention is shown. Here, the electronic locking device 10 is used for locking a container 1, in particular for retrofitting a key safe.

The electronic locking device 10 shown here has an electrically operable actuator 12 for transferring the electronic locking device 10 from a closed configuration to an open configuration. It is operable by the actuator 12 to move at least one latch element 17 of a latch device from a latch receptacle (on the locking device side) to an area outside the latch receptacle. Alternatively, the actuator can be provided for transferring the electric locking device 10 from an open configuration to a closed configuration. It can be caused by the actuator 12 that the at least one latch element 17 of the latch device is moved from the area outside the latch receptacle, in particular from the latch element receptacle 60 (on the container side), into the latch receptacle (on the locking device side). Furthermore, the locking device 10 has a near-field data transmission device 14 (and an antenna 15 connected thereto) for receiving data from at least one mobile terminal 16 temporarily located within a defined distance range from the electronic locking device 10 and for transmitting data, in particular access data, to the at least one mobile terminal 16 temporarily located within a defined distance range from the electronic locking device 10. The reference sign 18 indicates a memory unit for at least temporarily storing time data and/or access data and/or data of a sensor device and/or detection device. The time data have at least data on the last opening time (reaching the opened configuration) and/or at least data on the last closing time (reaching the closed configuration). The access data have at least authorization data and identification data. The authorization data define in dependence on which identification data the actuator 12 transfers the locking device 10 from the closed configuration to the open configuration, and the identification data provide an assignment to the mobile terminal 16. Furthermore, a processor device 20 is provided for matching the authorization data and the identification data. The actuator 12 can be controlled by the processor device 20 to open the locking device 10 in the event of a positive match, wherein a positive match preferably represents a defined match of the matched data. The shown locking device comprises at least one power source 22 different from a fixed current connection for operating at least the actuator 12, the near field data transmission device 14, the memory unit 18 and/or the processor device 20. The reference sign 80 denotes at least one directional antenna, wherein the directional antenna 80 is provided for transmitting energy/data and/or signals to a preferably passive NFC tag 82, in particular RFID tag, and/or for receiving energy/data and/or signals from the RFID tag, wherein the directional antenna 80 is connected to the processor device 20, wherein data and/or signals from the NFC tag 82, in particular RFID tag, can be fed to the processor device 20 via the directional antenna 80 up to a maximum distance between the NFC tag 82, in particular RFID tag, and the directional antenna 80, wherein the maximum distance is preferably less than 30 mm, in particular less than 20 mm or less than 10 mm, wherein the data and/or signals from the NFC tag 82, in particular RFID tag, represent at least position signals and/or position data, wherein a target orientation of the locking device 10 is represented by the position signals and/or position data, and/or wherein the data and/or signals from the NFC tag 82, in particular RFID tag, represent at least installation data, wherein an assignment of the locking device 10 to the NFC tag 82, in particular RFID tag, can be evaluated by the installation data.

The locking device 10 has an elongate base body 4, the elongate base body 4 having a first end 5 and a second end 6 spaced apart from the first end 5 in the longitudinal direction of the base body 4, the actuator 12, the near-field data transmission device 14, the memory unit 18, the processor device 20, the locking device 17, the energy source 22 and the directional antenna 80 being connected at least indirectly, and preferably directly, to the base body 4, in particular forming a common assembly, the directional antenna 80 being arranged in the radial direction of the base body 4 for transmitting energy and/or data and/or signals. In the region of the first end 5 of the base body 4, in particular closer spaced to the first end 5 than to the second end 6 of the base body 4, at least one latch element 17 of the latch device is provided.

Furthermore, the base body 4 forms or has a front cover 7 for covering a container 1, in particular a safe.

The first end 5, in particular the front cover 7, constitutes an actuating device for moving the base body 4, wherein the actuator 12, the near-field data transmission device 14, the memory unit 18, the processor device 20, the energy source 22, the directional antenna 80 and the locking device 17 are arranged at a distance from the actuating device in the longitudinal direction, The directional antenna 80 is formed as an inductive element, wherein the directional antenna 80 may be arranged or formed in conductive paths of the circuit board. Alternatively, the directional antenna 80 may be integrated in or arranged on the peripheral wall of the base body 4.

The latch element 17 is formed as a locking pin and the directional antenna 80 is arranged at a defined angle to the locking pin 17, wherein the directional antenna 80 is aligned in an operating state in a position by which it is predetermined that the locking pin 17 is displaceable in a direction which differs from a direction oriented vertically downwards, in particular differs by at least +/−5° or at least +/−10° or at least +/−15° or at least +/−20°.

From the processor device 20, the near field data transmission device 14 is controllable to transmit target position data when the processor device 20 receives position signals and/or position data representing a target orientation of the locking device 10.

In response to the target position data transmitted by the near field data transmission device 14, locking commands for locking the locking device 10 are receivable from the near field data transmission device 14, the actuator 12 being controllable by the processor device 20 in response to the received locking commands for locking the locking device 10.

A lock sensor 62, 64, in particular a touch sensor 62 or a light barrier 64, is provided for monitoring the closed configuration, wherein lock signals and/or lock data can be generated by the lock sensor 62, 64, wherein the lock signals and/or lock data in one configuration represent the presence of the latch element 17 in the latch receptacle (on the container side) and/or wherein the lock signals and/or lock data in a further configuration represent the presence of the latch element outside the latch receptacle.

From the processor device 20, the near field data transmission device 14 is controllable to transmit target position data when the processor device 20 receives position signals and/or position data representing a target orientation of the locking device 10 and when the processor device 20 receives locking signals and/or locking data of the locking sensor 62, 64 in the configuration in which the locking signals and/or locking data represent the presence of the latch element 17 in the latch receptacle.

The present embodiment is advantageous because it can be used to determine whether the locking device is in the associated cylinder or container 1 before it is locked. This embodiment can particularly preferably serve as a “retrofit” upgrade solution, whereby it is possible to upgrade the cylinders or containers 1 without costly technical modifications to the existing, permanently installed cylinders. There is also usually not much space in the cylinders or containers 1, which is why the solution is particularly preferably very small.

The present solution works with NFC technology, in particular RFID technology. For this purpose, a passive NFC tag, in particular RFID tag, is preferably glued into the cylinder or container 1 about 30 mm behind the front edge. The tag is preferably only a few tenths of a millimeter thick and is particularly preferably protected with a resistant coating, in particular made of a polymer material, against simple mechanical damage. An NFC antenna, in particular an RFID antenna, is integrated in the locking device and positioned in such a way that the NFC tag, in particular the RFID tag, can only be read when the locking device 10 is inserted in the cylinder or container 1.

If the locking device 10 is in the cylinder or container 1 and the NFC tag, in particular RFID tag, is read, then the locking device 10 can signal to an app, e.g. via near-field technology, that the locking device 10 is now ready to be closed. As long as the tag cannot be read by the locking device 10, it refuses the command to close.

Since the app is either directly connected to the server 38 that monitors the usage data or synchronizes this data at a later time, it is possible to centrally track who successfully closed the locking device 10 and when.

In principle, it is not relevant for the function of the solution whether the NFC tag, in particular RFID tag, is attached in the cylinder at the bottom, at the top or on one side. However, since the antenna in the locking device 10 must be correctly aligned in order to read the tag, it is helpful to place a corresponding mark on the locking device 10 as to how it must be inserted. For example, if the tag is attached to the top of the cylinder or container 1, a mark for "top" can be placed on the faceplate so that the user knows with which orientation the locking device can close the container 1. A visual or acoustic feedback on the part of the locking device 10 once the correct position is found and the tag can be read further facilitate this.

Since the NFC field, in particular RFID field, or the antenna can be adjusted very well in the defined environment of the cylinder or container 1, but many parameters can influence in which position exactly the tag can be read, there will certainly be situations in which the tag can already be read, but the locking device 10 is not yet completely inserted in the cylinder or container 1. If the locking device 10 is not yet fully inserted in the cylinder or container 1, however, the locking bolt cannot engage and the locking device 10 will not be locked.

In such a case, the supposedly locked locking device 10 could be removed again with little effort, since the bolt 17 has not engaged. However, since the locking device 10 not only evaluates the NFC tag, in particular RFID tag, but also has sensors 62, 64 (e.g., pushbuttons) that detect whether the locking bolt 17 is engaged, appropriate warnings can be generated in this case.

For example, it may be communicated to the server 38 that the locking device 10 is not properly locked. In turn, the server 38 may notify the user via various communication channels that the locking process has not been successfully completed. In addition, the locking device 10 itself may also use audible or visual signals to signal to the user that there is still a problem. Preferably, each electric locking device described in this paper comprises one or at least one output device, in particular for outputting signals and/or information visually and/or acoustically.

After an NFC tag, in particular RFID tag, contains a unique ID, the locking device 10 can also be configured to function only in exactly this cylinder or container 1. This is a significant advantage, for example, for inventory purposes.

Additionally or alternatively, at least one sensor device 23 (cf. FIG. 1 and FIG. 7) can preferably also be supplied with energy from the energy source 22, in particular at least temporarily.

Furthermore, the locking device 10 according to the invention can have at least one control device 21 (cf. FIG. 1 and FIG. 6) for activating one or more device(s) deactivated in an idle state. Preferably, the device deactivated in an idle state is at least one or more of the following devices the actuator 12, the near-field data transmission device 14, the memory unit 18 and/or the processor device 20. The control device 21 is preferably connected to the sensor device 23 at least via a signal and/or data connection. Sensor data or sensor signals generated by the sensor device 23 are preferably transmittable to the control device 21 via the signal and/or data connection. At least one deactivated device can preferably be activated by the control device 21 as a function of the sensor data or sensor signals. (cf. FIG. 1 or FIG. 7).

Additionally or alternatively, the processor device 20 compares the sensor signals and/or sensor data of the sensor device 23 with defined sensor signals and/or defined sensor data, the defined sensor signals and/or defined sensor data representing a movement or a group of permissible movements and/or an impermissible movement or a group of impermissible movements, it being possible for an alarm function to be triggered by the processor device 20 if it is determined by the comparison that the sensor signals and/or sensor data represent movements which deviate from permissible movements and/or which correspond to impermissible movements. (cf. FIG. 5 or FIG. 7)

Additionally or alternatively, a detection device 96 (cf. FIG. 6 or FIG. 7) can preferably also be supplied with energy, in particular at least temporarily, from the energy source 22.

Preferably, a receiving device 92 can be provided for receiving at least one holding device 90 for holding at least one object 2, in particular at least one mechanical key. Furthermore, the at least one detection device 96 may be provided for detecting the presence of the at least one holding device 90 in or on the receiving device 92 and for generating detection signals and/or detection data depending on the detected presence. (cf. FIG. 6 or FIG. 7)

FIG. 3*a* shows a container 1, in particular a key safe, which is permanently installed in a wall 66, in particular a stone wall, in particular a mural or a house wall. The container 1 has an opening into which the locking device 10 according to the invention can be inserted.

The container 1 has a container wall forming the inner boundary surface, through which preferably at least one latch element receptacle (on the container side) or a notch 60, in particular a circumferential notch, in particular a completely circumferential notch, for receiving one or at least one locking pin 17 of the locking device 10 is provided. The reference signs 62 and 64 thereby preferably indicate optical sensors and/or contact sensors for detecting the presence of a latch element 17 in the latch element receptacle 60.

FIG. 3*b* shows the locking device 10 in an installed state or in an operating configuration or in a locking configuration, i.e. the latch element 18 is inserted into the latch element receptacle 60.

FIG. 3*c* shows an embodiment according to which a directional antenna 70 is arranged or formed on the locking device 10 and according to which an NFC tag, in particular RFID tag, is arranged or formed on the container 1. The NFC tag and the directional antenna 70 are aligned such that they can exchange signals and/or data and/or energy only in a correct installation position of the locking device 10 in the container 1. Preferably, the locking device 10 thus transmits a signal and/or data to a mobile terminal 16 when the directional antenna 70 and the NFC tag 72 are arranged in sufficiently coincident positions, thereby allowing a user or operator to be notified when the locking device 10 is correctly positioned.

FIG. 3*d* schematically shows a sectional view of the embodiment shown in FIG. 3*c*.

FIG. 4 shows a lever device 74 for attaching NFC tags in containers, in particular key safes, with notch 60, in particular circumferential notch 60.

The lever device 74 preferably has an installation recess 75 for insertion into the notch 60 of the key safe. The installation depth is predetermined by the interaction of the installation recess and the notch 60. A lever element 76 is mounted at a pivot point 77, wherein on one side of the pivot point 77 there is a short lever arm with a holding element for holding the NFC tag, and wherein on the other side of the pivot point 77 there is a lever arm that is longer than the short lever arm. Preferably, the longer lever arm is spring-loaded (cf. spring element 78). Further, the lever device 74 comprises a first outer ring 78 and a second outer ring 79, the first and second outer rings 78, 79 remaining outside the container 1. The first outer ring 78 preferably surrounds a majority or all of the second outer ring 79. The reference sign 98 indicates a device for aligning the first ring 78, in particular a spirit level. The second outer ring 79 is preferably rotationally movable, whereby the lever element 76 and the pivot point 77 moves along a circular path inside the container 1. In particular, it is thereby possible to adjust an angular position in which the NFC tag is to be adhered to the container wall.

Referring to FIG. 5, another exemplary example of a locking device 10 according to the invention is shown. Here, the electronic locking device 10 is used for locking a container 1, in particular for retrofitting a key safe 1.

The electric locking device 10 shown here has an electrically operable actuator 12 for transferring the electric locking device 10 from a closed configuration to an open configuration. It is causable by the actuator 12 to move at least one latch element 17 of a latch device from a latch receptacle (on the locking device side) to an area outside the latch receptacle. Alternatively, the actuator can be provided for transferring the electric locking device 10 from an open configuration to a closed configuration. It can be affected by the actuator 12 that the at least one latch element 17 of the latch device is moved from the area outside the latch receptacle, in particular from the latch element receptacle 60 (on the container side), into the latch receptacle (on the locking device side). Furthermore, the locking device 10 comprises a near-field data transmission device 14 (and an antenna 15 connected thereto) for receiving data from at least one mobile terminal 16 temporarily located within a defined distance range from the electronic locking device 10 and for transmitting data, in particular access data, to the at least one mobile terminal 16 temporarily located within a defined distance range from the electronic locking device 10. The reference sign 18 indicates a memory unit for at least temporarily storing time data and/or access data and/or data of a sensor device and/or detection device. The time data have at least data on the last opening time (reaching the opened configuration) and/or at least data on the last closing time (reaching the closed configuration). The access data have at least authorization data and identification data. The authorization data define in dependence on which identification data the actuator 12 transfers the locking device 10 from the closed configuration to the open configuration, and the identification data provide an assignment to the mobile terminal 16. Furthermore, a processor device 20 is provided for matching the authorization data and the identification data. The actuator 12 can be controlled by the processor device 20 to open the locking device 10 in the event of a positive match, wherein a positive match preferably represents a defined match of the matched data.

The shown locking device 10 preferably comprises at least one sensor device 23 for detecting at least one movement of the locking device 10 and for generating sensor signals and/or sensor data in dependence on the detected movement. Furthermore, the locking device 10 comprises at least one power source 22 other than a fixed power supply for operating at least the actuator 12, the near-field data transmission device 14, the memory unit 18, the processor device 20 and/or the sensor device 23.

The processor device 20 matches the sensor signals and/or sensor data of the sensor device 23 with defined sensor signals and/or defined sensor data. The defined sensor signals and/or defined sensor data represent a movement or a group of permissible movements and/or an impermissible movement or a group of impermissible movements, wherein an alarm function can be triggered by the processor device 20 if it is determined by the matching that the sensor signals and/or sensor data represent movements that deviate from permissible movements and/or that correspond to impermissible movements. The impermissible movement or group of impermissible movements represent vibrations or shocks resulting from a tool, in particular a drill or a hammer or a chisel, being applied to the locking device 10. Preferably, an AI model for matching the sensor signals and/or sensor data of the sensor device 23 with the defined sensor signals and/or defined sensor data is used and executed by the processor device 20.

From the processor device 20, the sensor signals and/or sensor data can be stored in the memory unit or memory device 18. Further data, in particular time of the beginning of the sensor signal acquisition and/or sensor data acquisition and/or end of the sensor signal acquisition and/or sensor data acquisition and/or date, can be acquired by the processor device 20 and stored in the memory unit 18. A closure sensor 62, 64, in particular a touch sensor 62 or a light barrier 64, is provided for monitoring the closed configuration, wherein closure signals and/or closure data can be generated by the closure sensor, wherein the closure signals and/or closure data in a closure configuration represent the presence of the latch element 17 in the closure position and/or wherein the closure signals and/or closure data in a manipulation configuration represent a position deviating from the closure position. By means of the alarm function which can be triggered by the processor device 20, the actuator for transferring the latch element 17 from the manipulation configuration to the locking configuration can be actuated if a deviation from the locking configuration or a manipulation configuration can be determined by the locking sensor 62, 64, in particular without a correct opening command having been received from the near field data transmission device 14. The sensor device 23 comprises at least one acceleration sensor, the acceleration sensor being configured to output acceleration signals and/or acceleration data as a function of forces introduced into the locking device 10. By means of the alarm function which can be triggered by the processor device 20, the output of an alarm signal, in particular via an optical and/or acoustic signal source of the electric locking device and/or of the container, can be caused as a function of the sensor signals and/or sensor data.

By means of the shock or movement sensor, in particular the acceleration sensor, typical vibration patterns can be detected which indicate an attempt to drill or pry open a lock. Among other things, pre-trained AI models are suitable for this purpose, which of course also only need to be executed if one of the sensors has struck and the locking device 10 has been woken up from deep sleep (in order to save power), in particular by a control device 21 (analogous to FIG. 1).

As soon as an unauthorized access attempt is detected, the locking device 10 can draw attention to itself by means of a visual and acoustic alarm in order to dissuade the attacker from his intention. In addition, all data relating to the access attempt (date, time, etc.) can be stored locally and transferred to the server 38 with the next synchronization.

The sensor for position detection (if provided) can also be used to detect unauthorized access. Since, limited by human anatomy, one can only perform a rotational movement of slightly more than 180 degrees with the hand, it may be presumed that if a continuous movement of the locking device 10 of more than 180 degrees is detected, it is not performed by a human hand. It may then well be suspected that an attempt is being made by exerting a continuous rotational movement (e.g., by means of a cordless screwdriver), as well as pulling or pushing, to cause the latch bolt 17 to retract/retract.

Should such an attempt be detected, the electronics of the locking device 10 may not only causes an alarm as described above and document the attempt. In the event of such an attack, the electronics may even actively work against the attempt.

Once the latch bolt 17 leaves the "fully closed" position (contact opens) during the unauthorized access attempt, the motor or actuator 12 that moves the bolt may attempt to compensate for the movement (the forced collapse) and push/drive the bolt back to the closed position until the "fully closed" state is reached.

Additionally or alternatively, the locking device 10 according to the invention may comprise at least one control device 21 for activating one or more devices deactivated in an idle state. Preferably, the device deactivated in an idle state is at least one or more of the following devices the actuator 12, the near-field data transmission device 14, the memory unit 18 and/or the processor device 20. The control device 21 is preferably connected to the sensor device 23 at least via a signal and/or data connection. Sensor data or sensor signals generated by the sensor device 23 are preferably transmittable to the control device 21 via the signal and/or data connection. At least one deactivated device can preferably be activated by the control device 21 as a function of the sensor data or sensor signals. (cf. FIG. 1 and FIG. 7)

Additionally or alternatively, a detection device 96 (cf. FIG. 5 or FIG. 6) can preferably also be supplied with energy, in particular at least temporarily, from the energy source 22.

Preferably, a receiving device 92 can be provided for receiving at least one holding device 90 for holding at least one object 2, in particular at least one mechanical key. Furthermore, the at least one detection device 96 may be provided for detecting the presence of the at least one holding device 90 in or on the receiving device 92 and for generating detection signals and/or detection data depending on the detected presence. (cf. FIG. 6 and FIG. 7)

Additionally or alternatively, at least one directional antenna is provided, wherein the directional antenna is provided for transmitting energy/data and/or signals to a preferably passive NFC tag, in particular RFID tag, and/or for receiving energy/data and/or signals from the RFID tag. The directional antenna is preferably connected to the processor device, whereby data and/or signals from the NFC tag, in particular RFID tag, can be fed to the processor device via the directional antenna up to a maximum distance between the NFC tag, in particular RFID tag, and the directional antenna. The maximum distance is preferably less than 30 mm, in particular less than 20 mm or less than 10 mm, wherein the data and/or signals from the NFC tag, in particular RFID tag, represent at least position signals and/or position data, wherein a target orientation of the locking device is represented by the position signals and/or position data, and/or wherein the data and/or signals from the NFC tag, in particular RFID tag, represent at least installation data, wherein an assignment of the locking device to the NFC tag, in particular RFID tag, can be evaluated by the installation data. (cf. FIG. 2 and FIG. 7)

According to FIG. 6, a further exemplary example of a locking device 10 according to the invention is shown. Here, the electronic locking device 10 is used for locking a container 1, in particular for retrofitting a key safe.

The electronic locking device 10 shown here has an electrically operable actuator 12 for transferring the electronic locking device 10 from a closed configuration to an open configuration. It is causable by the actuator 12 to move at least one latch element 17 of a latch device from a latch receptacle (on the locking device side) to an area outside the latch receptacle. Alternatively, the actuator can be provided for transferring the electric locking device 10 from an open configuration to a closed configuration. It can be affected by the actuator 12 that the at least one latch element 17 of the latch device is moved from the area outside the latch receptacle, in particular from the latch element receptacle 60 (on the container side), into the latch receptacle (on the locking device side). Furthermore, the locking device 10 has a near-field data transmission device 14 (and an antenna 15 connected thereto) for receiving data from at least one mobile terminal 16 temporarily located within a defined distance range from the electronic locking device 10 and for transmitting data, in particular access data, to the at least one mobile terminal 16 temporarily located within a defined distance range from the electronic locking device 10. The reference sign 18 indicates a memory unit for at least temporarily storing time data and/or access data and/or data of a sensor device and/or detection device. The time data comprise at least data on the last opening time (reaching the opened configuration) and/or at least data on the last closing time (reaching the closed configuration). The access data have at least authorization data and identification data. The authorization data define in dependence on which identification data the actuator 12 transfers the locking device 10 from the closed configuration to the open configuration, and the identification data provide an assignment to the mobile terminal 16. Furthermore, a processor device 20 is provided for matching the authorization data and the identification data. The actuator 12 can be controlled by the processor device 20 to open the locking device 10 in the event of a positive match, wherein a positive match preferably represents a defined match of the matched data.

The locking device 10 comprises a receiving device 92 for receiving at least one holding device 90 for holding at least one object 2, in particular at least one mechanical key. Additionally, the locking device 10 comprises at least one detection device 96 for detecting the presence of the at least one holding device 90 in or on the receiving device 92 and for generating detection signals and/or detection data in dependence of the detected presence.

Further, the locking device 10 comprises at least one power source 22 other than a fixed power supply for powering at least the actuator 12, the near-field data transmission device 14, the memory unit 18, the detection device 96, and/or the processor device 20. The receiving device 92 forms a defined shaped receiving area for limiting the insertion of coupling pieces 94 from holding devices 90 to holding devices 90 having a coupling piece 94 with a corresponding shape. Additionally or alternatively, the receiving device 92 forms a receiving area, wherein the receiving area 92 is configured for holding the holding device 90, in particular the coupling piece 94, in a form-fitting and/or force-fitting and/or field-fitting manner. The receiving device 92 is preferably designed as a metal plate or metal element and the holding device 90 is preferably magnetic, in particular so strongly magnetic that the holding device 90 can be arranged or fastened to the receiving device 92 via a field connection. A detection device 96 is arranged in the region of the receiving area 92, in particular arranged adjacent to the receiving area 92, wherein the detection device 96 is at least indirectly and preferably directly connected to the processor device 20 for transmitting energy, data and/or signals to the processor device 20. The locking device 10 comprises an elongate base body 4. The elongate base body 4 has a first end 5 and a second end 6 spaced from the first end 5 in the longitudinal direction of the base body 4. The actuator 12, the near-field data transmission device 14, the memory unit 18, the processor device 20, the latch device 17, the energy source 22, the receiving device 92 and the detection device 96 are at least indirectly, and preferably directly, connected to the base body 4, in particular forming a common assembly. The first end 5 has a front cover 7, wherein the front cover 7 in an operating configuration on the one hand faces the surroundings and on the other hand is oriented in the direction of the interior of the container 1, wherein the detection device 96 is arranged or formed at a distance from the front cover 7 in the longitudinal direction, and wherein the receiving device 92 at least partially forms the second end 6. The detection device 96 is particularly preferably designed as a Hall sensor.

The Hall sensor generates a magnetic field signal and/or magnetic field data as a function of a detected magnetic field and transmits the magnetic field signal and/or magnetic field data to the processor device 20, wherein the magnetic field signals and/or magnetic field data indicate whether the detected magnetic field has defined properties or has properties that deviate from the defined properties. The detection device 96 is a directional antenna for receiving object signals and/or object data, wherein the object signals and/or object data can be generated by an NFC tag, in particular RFID tag, arranged or generated on or in the holding device 90. The directional antenna 96 is oriented in the axial direction of the base body 4 for receiving object signals and/or object data. The near field data transmission device 14 is controllable by the processor device 20 for transmitting object data when the processor device 20 receives object data and/or object signals representing a defined holding device 92. Alternatively, the near field data transmission device 14 is controllable to transmit object data when the processor device 20 receives magnetic field signals and/or magnetic field data representing a defined magnetic field.

In response to the object data or magnetic data transmitted by the near-field data transmission device 14, locking commands for locking the locking device 10 are receivable from the near-field data transmission device 14, wherein the actuator 12 is controllable by the processor device 20 in dependence on the received locking commands for locking the locking device 10.

The present solution thus describes a specific key holder/key fob with the holding device 90. The objects to be protected are fixedly (non-detachably) attached to this. The key fob has a magnetic holder by means of which it can be fixed to the rear side 6 of the locking device 10.

However, the magnet preferably has not only the function of fixing the key fob 90 on the rear side 6. Particularly preferably, a Hall sensor in the locking device 10 is used to check whether the key fob or holding device 90 is fixed to the rear wall or whether it is currently not present.

To prevent any magnet from being held to the Hall sensor to simulate that the key 2 would have been returned various safety precautions are conceivable, individually or in combination.

First, the key fob or holding device 90 (on the magnet side) can be given a specific shape, the exact equivalent of which can then be found on the back 6 of the locking device 10. For example, with notches, pins, recesses, etc., a kind of key lock principle could be applied so that the magnet only holds on the back wall when the key fob 90 "locks" into place. This would also have the added advantage of improving the hold of the key fob on the base body 4.

In addition, the field strength of the magnet can be monitored, if necessary. So, if a weaker or stronger magnet than the one actually intended for it is used, then this can be detected.

For even more security, the key fob 90 can be equipped with an NFC tag, in particular an RFID tag, (this can be implemented analogously to the cylinder detection described above). Then, the key fob 90 is only recognized as being present if the corresponding tag can be read by the locking device 10.

Via a data exchange mechanism, the message is then sent to the server, in particular indirectly via the mobile terminal 16, at the latest when the lock is locked, as to whether the object 2 to be protected is present or not.

In addition or alternatively, a sensor device 23 can preferably also be supplied with energy from the energy source 22, in particular at least temporarily.

Furthermore, the locking device 10 according to the invention may comprise at least one control device 21 for activating one or more device(s) deactivated in an idle state. Preferably, the device deactivated in an idle state is at least one or more of the following devices the actuator 12, the near-field data transmission device 14, the memory unit 18 and/or the processor device 20. The control device 21 is preferably connected to the sensor device 23 at least via a signal and/or data connection. Sensor data or sensor signals generated by the sensor device 23 are preferably transmittable to the control device 21 via the signal and/or data connection. At least one deactivated device can preferably be activated by the control device 21 in dependency of the sensor data or sensor signals. (cf. FIG. 1 and FIG. 7)

In addition or alternatively, the processor device 20 compares the sensor signals and/or sensor data of the sensor device 23 with defined sensor signals and/or defined sensor data, the defined sensor signals and/or defined sensor data representing a movement or a group of permissible movements and/or an impermissible movement or a group of impermissible movements, it being possible for the processor device 20 to trigger an alarm function if it is determined by the comparison that the sensor signals and/or sensor data represent movements which deviate from permissible movements and/or which correspond to impermissible movements. (cf. FIG. 5 and FIG. 7)

Additionally or alternatively, at least one directional antenna 70 is provided, wherein the directional antenna 70 is provided for transmitting energy/data and/or signals to a preferably passive NFC tag 72, in particular RFID tag, and/or for receiving energy/data and/or signals from the RFID tag. The directional antenna 70 is preferably connected to the processor device 20, wherein data and/or signals from the NFC tag 72, in particular RFID tag, can be fed to the processor device 20 via the directional antenna 70 up to a maximum distance between the NFC tag, in particular RFID tag, and the directional antenna 70. The maximum distance is preferably less than 30 mm, in particular less than 20 mm or less than 10 mm, wherein the data and/or signals from the NFC tag 72, in particular RFID tag, represent at least position signals and/or position data, wherein a target orientation of the locking device 10 is represented by the position signals and/or position data, and/or wherein the data and/or signals from the NFC tag 72, in particular RFID tag, represent at least installation data, wherein an assignment of the locking device 10 to the NFC tag 72, in particular RFID tag, can be evaluated by the installation data. (cf. FIG. 2 and FIG. 7)

FIG. 7 shows a particularly preferred example of an electric locking device 10 according to the invention. This embodiment has several of the devices and/or functions explained with respect to the embodiments in FIGS. 1, 2, 5 and 6. Therefore, reference is made to these figures.

An electronic Locking device according to the invention for locking a container, in particular for retrofitting a key safe, thus preferably comprises at least one electrically operable actuator for transferring the electric locking device from a closed configuration to an open configuration, it being possible for the actuator to cause that at least one latch element of a latch device is moved out of a latch receptacle into a region outside the latch receptacle, or for transferring the electric locking device out of an open configuration into a closed configuration, it being possible for the actuator to cause the at least one latch element of the latch device to be moved out of the region outside the latch receptacle into the latch receptacle. Furthermore, the locking device according to the invention preferably comprises a near-field data transmission device for receiving data from at least one mobile terminal temporarily located in a defined distance range from the electronic locking device and for transmitting data, in particular access data, to the at least one mobile terminal temporarily located in a defined distance range from the electronic locking device, the near-field data transmission device having at least one near-field data transmission antenna for receiving and/or transmitting the data. Furthermore, the locking device according to the invention preferably comprises a memory unit for at least temporarily storing time data and/or access data. The time data preferably have at least data on the last opening time (reaching the opened configuration) and/or at least data on the last closing time (reaching the closed configuration). The access data preferably have at least authorization data and identification data. The authorization data preferably define in dependence of which identification data the actuator transfers the locking device from the closed configuration to the open configuration. The identification data preferably specify an assignment to the mobile terminal. Furthermore, the locking device according to the present invention may comprise one or more of the features and/or functions proposed by the present document, in particular in combination with each other.

Furthermore, the present invention may also relate to a system. This system preferably comprises at least a plurality of locking devices 1 described in the present document. Furthermore, the system comprises a plurality of mobile terminals 16, preferably each mobile terminal 16 comprising a near-field data transmission means 34 for data exchange with the near-field data transmission device 14 of the locking devices 1 and further preferably each mobile terminal comprises a far-field data transmission device 36, in particular LTE, for data exchange with a server device 38. Furthermore, each mobile terminal preferably comprises a processor unit 40 for executing a control application and a memory unit 42 for storing lock reconfiguration data and lock operation data. The lock operation data is preferably transmitted to the near-field data transmission means 34 of the respective mobile terminal 16 by the near-field data transmission device 14 for transmission to the server device 38, and the lock operation data preferably comprises at least time data and access data. The time data preferably comprises at least data on the last opening time and/or at least data on the last closing time. Particularly preferably, at least one server device 38, in particular a cloud server device, is provided, wherein the server device 38 receives the lock operation data from the respective mobile terminal 16 and, after receiving the lock operation data, generates lock reconfiguration data and sends this to the mobile terminal 16 from which it received the lock operation data or sends it to another mobile terminal 16 which is assigned to the locking device 1, or sends it to a group of mobile terminals 16, wherein all mobile terminals 16 assigned to the group are assigned to the locking device 1.

FIGS. 8 to 11 show purely schematically an example of a sequence of the method according to the invention for actuating, in particular opening and/or closing, a locking device 10, in particular a safe, such as a key safe.

It can be seen that an electric locking device 10, in particular for locking a container without a permanent internet connection, is provided, wherein the container, in particular an electric locking device 10 locking the container, comprises a near-field communication device and thereby provides a near-field communication area.

Further, the provision of at least one mobile terminal 16, in particular a plurality of mobile terminals, in particular more than 5 per 100 km2 or more than or up to 10 per 100 km2 or more than or up to 15 per 100 km2 or more than or up to 25 per 100 km2 or more than or up to 50 per 100 km2 or more than or up to 100 per 100 km2 or more than or up to 200 per 100 km2 or more than or up to 500 per 100 km2 takes place.

Here, the mobile terminal 16 comprises a near-field data transmission means 34 for data exchange with the near-field data transmission device 14 of the electric locking device 10 and further preferably comprises a particularly preferred wireless far-field data transmission device 36, in particular GSM, UMTS, LTE, etc., for data exchange with a server 38.

Furthermore, according to the invention, a transmission infrastructure, in particular one or more transmission stations, in particular transmission masts, is used. The far-field data transmission device 36 transmits and preferably receives data simultaneously or with a time delay or at times simultaneously. The received data is received by the far-field data transmission device 36 via the transmission infrastructure, wherein the transmission infrastructure receives data from a server or a server device 38, in particular a cloud server. The transmitted data is transmitted from the far-field data transmission device 36 to the transmission infrastructure for forwarding to the server or server device 38.

The mobile terminal 16 thereby comprises a processor unit 40 (or processor device) for executing a control application, further the mobile terminal 16 comprises a memory unit 42 (or memory device) for storing data, in particular lock reconfiguration data and lock operation data. Preferably, all data that is transmitted from the central server unit, or from the lock unit to the mobile application and (temporarily) stored there is protected from external access by encryption, in particular by local encryption. That is, preferably neither the user of the application itself nor a third party can directly access the data stored in the mobile application, in particular also not by reading out the physical memory of the mobile device. The encryption method and/or the exact parameters of the encryption are preferably configured centrally by the administrator of the server unit and transmitted from there to the mobile application.

Figure 9:
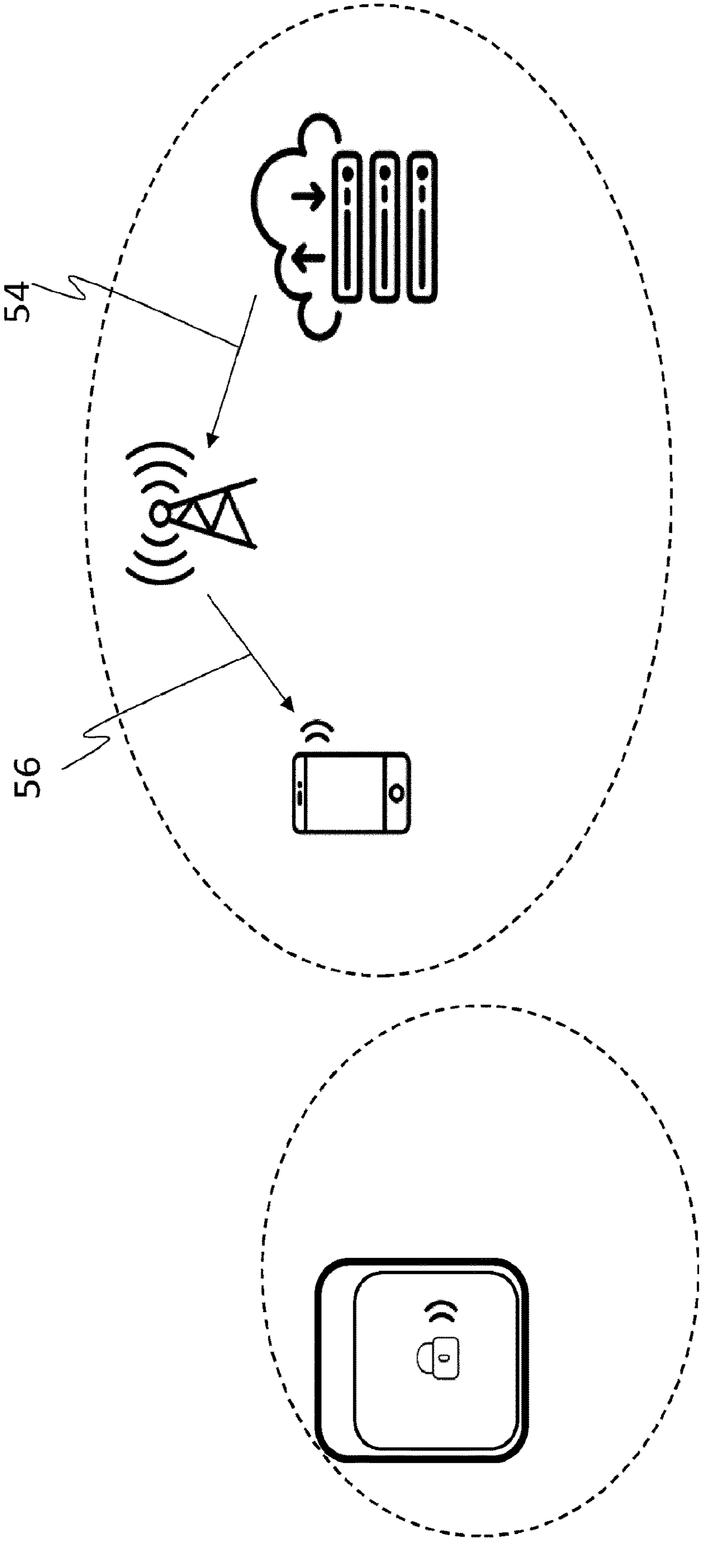

FIG. 9 shows schematically that the mobile terminal receives access data from a server or server unit, wherein the access data being transmitted via the transmission infrastructure.

The user rights and/or the lock configurations, and preferably the transmissions of all relevant sensor data, or other data of the lock units is/are preferably managed by one or more operators/administrators.

FIG. 10 schematically shows that the mobile terminal 16 transmits the access data to the locking device via the near-field data transmission device. Thereupon, the lock operation data is transmitted by the near-field data transmission device 14 to the near-field data transmission means 34 of the mobile terminal 16 for forwarding to the server device. It can be seen purely schematically that the mobile terminal 16 is outside the range of the transmission infrastructure or cannot establish a mobile data connection to the Internet.

FIG. 11 schematically shows that the mobile terminal 16 transmits lock operation data to the server or server device as soon as it is again within the coverage area of the transmission infrastructure or as a result of a defined triggering event (only if a data connection to the Internet exists), in particular a key actuation and/or a location data evaluation and/or a time evaluation.

The mobile terminal 16 receives the lock reconfiguration data from the server 38 via the far-field data transmission device 36, the lock reconfiguration data being generated in response to the lock operation data transmitted to the server 38 by means of the near-field data transmission means 34, the lock operation data comprising at least time data and access data.

FIGS. 8 to 11 thus illustrate a method of opening an electric locking device 10. The method comprising at least the steps of: Providing an electric locking device 10, providing at least one mobile terminal 16, said mobile terminal 16 comprising a near field data transmission means 34 for data exchange with the near field data transmission means 14 of the electric locking device 10, said mobile terminal 16 comprising a far field data transmission means 36, in particular LTE, for data exchange with a server 38, said mobile terminal 16 comprising a processor unit 40 for executing a control application, said mobile terminal 16 comprising a memory unit 42 for storing lock reconfiguration data and lock operation data, wherein the lock operation data is transmitted by the near-field data transmission device 14 to the near-field data transmission means 34 of the mobile terminal 16 for forwarding to the server device 38, and wherein the mobile terminal 16 receives the lock reconfiguration data from the server 38 via the far-field data transmission device 36, the lock reconfiguration data being generated in response to the lock operation data transmitted to the server 38 by the near-field data transmission means 34, the lock operation data including at least time data and access data.

FIG. 12 shows a schematic flow of the method according to the invention, said flow comprising a plurality of additional or alternative steps. The steps S1-S25 shown here comprise:

S1. Operator/administrator creates a lock unit 10 with a unique identifier on the central server unit 38 and associates it with a lock group, if necessary.

S2. Operator/administrator creates a user/operator on the central server unit 38 or provides a defined user group with the option of registering themselves on the central server unit 38 (self-service).

S3. The user downloads the necessary software from an app store or another online storage location to his mobile device or mobile terminal (e.g. smartphone). In principle, this can be done from anywhere in the world.

S4. The user logs in to the central server unit 38 via his app. To do this, he uses access data known to him (as created by the operator/administrator in step 1) or, in the case of self-service, he registers and selects his access data accordingly himself.

S5. The central server unit 38 checks whether access rights to one or more locks or lock groups exist for this user or the group(s) in which the user is assigned. If access rights are available, they are transmitted to the mobile unit or mobile terminal 16, preferably in encrypted form (if necessary with additional information). The access rights can also be subject to time restrictions. For example, an access right may automatically expire after 24 hours, in case that no further synchronization between mobile unit 16 and central server unit 38 takes place during this period.

During each synchronization between the mobile unit 16 and the central server unit 38, the system clocks in particular are synchronized in addition to the access rights and other information, so that deviations in the clocks can be considered in each case.

S6. The access data and additional information received by the mobile unit 16 are temporarily stored locally in encrypted form in a "virtual key ring". In the process, the mobile unit 16 regularly checks whether an access right still exists and, if necessary, deletes all access rights that have already expired.

S7. If the user now wants to open a locking device 10 and is within range of it with his mobile unit 16, the mobile unit 16 will either automatically (in the background) establish a connection to the locking device, or after manual input in the mobile unit ("Connect button"). In this case, the connection between mobile unit 16 and locking device can be further encrypted beyond the encryption included in the transmission standard.

S8. When establishing the connection to the mobile unit 16, the locking device 10 transmits a unique Identifier to the mobile unit 16. If necessary, further information can also be transmitted (e.g. membership of a particular lock group).

S9. The mobile unit 16 checks whether access rights exist in the local memory for this locking device 10, or the lock group. A connection to the central server unit 38 is not established during this process.

S10. If access rights exist, it may be necessary (depending on the configuration by the operator/administrator) that further keys are required to operate the locking device 10 (e.g. pin entry, scanning of a barcode, etc.) which must be entered in the mobile unit and transmitted to the locking device 10. In addition, it may be necessary to establish a connection to the central server unit 38, since the configuration specifies that the lock is only to be opened when a connection exists between the mobile unit and the central server unit 38 in order to further increase security, since access rights are always synchronized between the mobile unit and the central unit via an active connection.

S11. The mobile unit 16 sends a signal to the locking device 10 (after positive verification) to open and transmits the corresponding key.

S12. The locking device 10 checks the key and will store both the connection attempt and the result of the check, as well as all transmitted information about the user, or the mobile unit 16 in the internal temporary memory.

S13. After a positive check, the locking device 10 releases the locking mechanism and will also store this event in the temporary memory.

S14. The mobile unit 16 now transmits data to the locking device 10 that has been associated with the access right in the central server unit 38. In particular, the information that data provided by the locking device can be received there and now deleted locally. However, changes to the local configuration of the software of the locking device 10 can also be transmitted.

S15. The locking device 10 will erase the data received from the central unit from the local memory and perform any other necessary operations.

S16. The deletion, or the execution of the operations will be acknowledged.

S17. The locking device 10 will now transmit all data from the temporary memory (log data about accesses, access attempts, as well as all stored sensor data) to the mobile unit 16. It will also transmit all data that are already flagged for deletion, but the reception by the central server unit 38 has not yet been acknowledged.

S18. The mobile unit 16 receives the data from the locking device 10 and stores it in a protected area. The reception is preferably acknowledged.

S19. The locking device 10 will now mark (flag for deletion) all transmitted data with additional information, but will not yet delete it, since it is not yet certain that this data has also been received on the server unit 38. If necessary, data transmitted multiple times will be enriched with additional information.

S20. The connection between the locking device 10 and the mobile unit 16 is terminated again.

S21. The mobile unit 16 will now attempt to contact the central server unit 38 at the next possible, or at a configured, time and transmit the data transmitted by the locking device 10 to it.

S22. Once a connection is established between the mobile unit 16 and the central server unit 38, the data is transmitted and acknowledged by the central server unit 38.

S23. The acknowledged data is now deleted from the temporary memory of the mobile unit 16.

S24. The central server unit now updates the access right to the specific lock with the information that the defined data has been received and can be deleted locally (considering the information which data has already been deleted by the unit).

S25. The access right is now synchronized with all mobile units 16 that have access to the specific lock or to the associated lock group or locking device 10.

Thus, a method for asymmetric, or indirect, transmission of data between a transmitter and a receiver is disclosed.

Thus, sensor data (e.g.) collected at locations where temporarily or permanently, no internet connection or no connection to an alternatively suitable transmission network exists can be transmitted to a central server. Such "offline situations" exist in radio holes, underground, under water, etc.

In terms of content, the solution according to the invention preferably builds on the method also described herein for the secure assignment of unique access rights without the use of specialized hardware and without an existing Internet connection. A component here is a mobile application which runs on a device, in particular a server and/or several mobile terminals, which is connected via a mobile data connection to a server device, in particular a central server, and can receive access keys from the latter (analogous to the procedure described above) and store them locally.

If sensor data of an (offline) electric locking device 10 is now to be transmitted to the server device 38, in particular the central server, the mobile device or the mobile terminal 16 is to be brought into the vicinity of the electric locking device 10 so that the near-field transmission means 34 of the mobile terminal 16 can receive raw or processed or partially processed sensor data of one or more sensors arranged on or in the electric locking device 10. The sensor data may thereby be transmitted to the near-field data transmission means 34 of the mobile terminal 16 via the near-field data transmission device of the electric locking device 10. The sensor and/or the sensor device and/or detection device is provided with or coupled or connected to an electronic device, in particular the processor device 20, which stores the data provided by the sensor device and/or detection device, in particular in a configurable manner, locally, in particular in a memory unit 18.

If the mobile device 16 comes within range of the near-field data transmission device 14, it preferably authenticates itself to the electric locking device 10, in particular the processor device 20, by means of the access key and requests the content or defined data of the data, in particular time and/or sensor data and/or detection data, held or temporarily stored in the local memory.

If the processor device 20 accepts the access and the request, the requested data is transmitted to the mobile device 16 (e.g. Bluetooth or NFC or WLAN). After checking the completeness and correctness of the transmitted data, the mobile terminal 16 preferably transmits an erase signal or erase data, which triggers the erasure of at least part of the locally stored or temporarily stored data, in particular the sensor data and/or the detection data and/or time data (temporary memory emptied). Otherwise, the transmission is preferably requested again.

The same mechanism can also be used to transmit configuration changes to the electric locking device 10 and synchronize the local times (locking device 10 and mobile device).

After the connection is lost, the electric locking device 10 and the sensor(s) located or provided therein preferably operate completely autonomously and collect(s) data until next accessed by the mobile application.

The lock device data, in particular the data generated by the sensor or sensors, can thus be completely transmitted to a central unit, in particular the server device 38, even without a permanent Internet connection, by upstream transmission to a mobile terminal 16. Thus, a method for asymmetric or indirect transmission of data between a transmitter (mobile terminal 16) and a receiver (locking device 10) is provided, wherein, after the data setup, the mobile terminal 16 also receives data from the electric locking device 10 or the electric locking device 10 transmits data to the mobile terminal 16.

REFERENCE CHARACTER LIST

1 container
2 object
4 base body
5 first end
6 second end
7 front cover
10 locking device
11 opening/membrane
12 actuator
14 near field data transmission device
15 antenna unit
16 mobile terminal
17 latch element
18 memory unit
20 processor device
21 Control device
22 Power source
23 Sensor device
34 Near-field data transmission means
36 Far-field data transmission means
37 Far-field communication infrastructure
38 Server or server device
40 Processor unit of the mobile terminal
42 Storage unit of the mobile terminal

50 Coverage area of near field communication means of container
52 Coverage area of far-field communication infrastructure
54 Communication between server and transmitting infrastructure
56 Communication between transmitting infrastructure and mobile terminal
58 Near-field communication between near-field communication means and near-field communication device
60 latch element receptacle (container side)
62 tactile sensor
64 optical sensor, in particular light barrier
66 masonry/foundation
70 directional antenna
72 NFC tag
74 lever device
75 installation recess
76 lever element
77 pivot point
78 first outer ring
79 second outer ring
80 directional antenna
82 NFC tag
90 holding device
92 receiving device
94 coupling piece
96 detection device
98 device for aligning the first ring 78

What is claimed is:

1. An electronic locking device for locking a container, in particular for retrofitting a key safe, comprising:

at least one of:

an electrically operable actuator (12) for transferring the electric locking device from a closed configuration to an open configuration, wherein the actuator can cause at least one latch element of a latch device to be moved from a latch receptacle to a region outside the latch receptacle, or the electrically operable actuator (12) for transferring the electric locking device from an open configuration into a closed configuration, wherein the actuator can cause the at least one latch element of the latch device to be moved from the region outside the latch receptacle into the latch receptacle, and a near-field data transmission device (14) for receiving data from at least one mobile terminal (16) temporarily located in a defined distance range from the electronic locking device (10) and for transmitting data, in particular access data, to the at least one mobile terminal (16) temporarily located in a defined distance range from the electronic locking device (10), a memory unit (18) for at least temporarily storing time data and/or access data, wherein the time data comprises at least data on the last opening time for reaching the opened configuration and/or at least data on the last closing time for reaching the closed configuration, wherein the access data comprises at least authorization data and identification data, the authorization data defining in dependence on which identification data the actuator transfers the locking device from the closed configuration to the opened configuration, and the identification data specifying an assignment to the mobile terminal, a processor device (20) for matching the authorization data and the identification data, wherein the actuator (12) can be controlled by the processor device (20) to open the locking device (10) in the event of a positive matching, wherein a positive matching represents a defined correspondence of the matched data, at least one sensor device (23) for detecting at least one movement of the locking device (10) and for generating sensor signals and/or sensor data in dependency of the detected movement, at least one power source (22) other than a fixed power supply for operating at least the actuator (12), the near field data transmission device (14), the memory unit (18), the processor device (20) and/or the sensor device (23), at least one control device (21) for activating one or more devices deactivated in an idle state, wherein the device deactivated in the idle state is at least one or more of the following devices: the actuator (12), the near-field data transmission device (14), the memory unit (18) and/or the processor device (20), wherein the control device (21) is connected to the sensor device (23) at least via a signal and/or data connection, wherein sensor data or sensor signals generated by the sensor device (23) can be transmitted to the control device (21) via the signal and/or data connection, wherein at least one deactivated device can be activated by the control device (21) in dependency of the sensor data or sensor signals, wherein the processor device (20) can compare the sensor signals and/or sensor data of the sensor device (23) with defined sensor signals and/or defined sensor data, the defined sensor signals and/or defined sensor data representing a movement or a group of permissible movements and/or an impermissible movement or a group of impermissible movements, wherein the processor device (20) can trigger an alarm function if it is determined by the comparison that the sensor signals and/or sensor data represent movements which deviate from permissible movements and/or which correspond to impermissible movements, and wherein the actuator for transferring the latch element (17) from a manipulation configuration to a locking configuration can be actuated by the alarm function which can be triggered by the processor device (20) if the deviation from the locking configuration or the manipulation configuration can be determined by the locking sensor;

wherein the processor device (20) can store the sensor signals and/or sensor data in the memory unit (18), wherein further data, in particular the time of the start of the sensor signal acquisition and/or sensor data acquisition and/or the end of the sensor signal acquisition and/or sensor data acquisition and/or date, can be acquired by the processor device (20) and can be stored in the memory unit (18), a lock sensor (62, 64) comprising a touch sensor (62) or a light barrier (64), for monitoring the closed configuration, wherein lock signals and/or lock data can be generated by the lock sensor (62, 64), wherein the lock signals and/or lock data in one configuration represent the presence of the latch element (17) in the latch receptacle and/or wherein the lock signals and/or lock data in another configuration represent the presence of the latch element (17) outside the latch receptacle, wherein the lock signals and/or lock data in the locking configuration represent the presence of the latch element (17) in the locking position and/or wherein the lock signals and/or lock data in the manipulation configuration represent a position deviating from the locking position, wherein the alarm function which can be triggered by the processor device (20) can cause an alarm signal to be output, in particular via an optical and/or acoustic signal source of the electric locking device (10) and/or of the container, in dependency of the sensor signals and/or sensor data.

2. The locking device according to claim 1, characterized in that at least the actuator and the near-field data transmission device (14) are deactivated in the idle state, preferably at least the actuator (12), the near-field data transmission device (14) and the memory unit (18) are deactivated in the idle state.

3. The locking device according to claim 2, characterized in that an elongate base body (4) is provided, the elongate base body (4) having a first end (5) and a second end (6) spaced from the first end (5) in the longitudinal direction of the base body (4), the first end having actuating device for moving the base body (4), wherein longitudinally spaced from the actuating device are the actuator, the near field data transmission device (14), the memory unit (18), the processor device (20), the power source (22), the control device (21), the sensor device (23), and a latch device (17) movable by the actuator (12), wherein the actuator (12), the near-field data transmission device (14), the memory unit (18), the processor device (20), the sensor device (23) and the energy source (22) are connected at least indirectly, and preferably directly, to the base body (4), in particular form a common subassembly, and/or wherein at least one latch element (17) of the latch device is preferably provided in the region of the first end of the base body (4), in particular closer to the first end (5) than to the second end (6) of the base body (4), and/or the base body (4) preferably forms a front cover (7) for covering a container (1), in particular a safe, or has a front cover (7) for covering the container (1), in particular the safe.

4. The locking device according to claim 3, characterized in that the actuating device is designed for manually applying forces to the base body (4) for moving the base body (4) relative to the environment.

5. The locking device according to claim 4, characterized in that the sensor device (23) has at least one acceleration sensor, the acceleration sensor being designed to output acceleration signals and/or acceleration data in dependency of forces introduced via the actuating device.

6. The locking device according to claim 5, characterized in that the actuating device is of plate-like design, in particular flat and with roughness RA<25 μm, and preferably serves for manually initiating knocking pulses.

7. The locking device according to claim 6, characterized in that the control device (21) is configured for activating one or more or all of the deactivated devices as a function of a predetermined code, the code consisting at least of a sequence of acceleration signals and/or acceleration data, wherein for acceleration signals and/or acceleration data output by the acceleration sensor can be evaluated by the control device (21) for checking the code.

8. The locking device according to claim 3, characterized in that the actuating device comprises at least one lever element for at least partial rotation of the base body (4) and preferably serves for manual initiation of rotational movements.

9. The locking device according to claim 8, characterized in that the control device (21) is configured for activating one or more or all of the deactivated devices in dependency of a predetermined code, the code consisting at least of a sequence of position signals and/or position data, wherein position signals and/or position data output by the position sensor can be evaluated by the control device (21) for checking the code.

10. The locking device according to claim 7, characterized in that the control device (21) can activate the near-field data transmission device (14) as a result of the code being checked, signals and/or data for opening the locking device (10) can be received by means of the near-field data transmission device (14), the near-field data transmission device (14) being designed to transmit and receive signals and/or data by radio, in particular Bluetooth, WLAN, ZigBee or NFC.

11. The locking device according to claim 1, characterized in that at least one directional antenna (80) is provided, wherein the directional antenna (80) is provided for transmitting energy/data and/or signals to a preferably passive NFC tag (82), in particular RFID tag, and/or for receiving energy/data and/or signals from the RFID tag, wherein the directional antenna (80) is connected to the processor device (20), wherein data and/or signals from the NFC tag, in particular RFID tag, can be fed to the processor device (20) via the directional antenna up to a maximum distance between the NFC tag (82), in particular RFID tag, and the directional antenna (80), wherein the maximum distance is preferably less than 30 mm, in particular less than 20 mm or less than 10 mm, wherein the data and/or signals from the NFC tag (82), in particular RFID tag, represent at least position signals and/or position data, wherein the position signals and/or position data represent a target orientation of the locking device (10) and/or wherein the data and/or signals from the NFC tag (82), in particular RFID tag, represent at least installation data, wherein an assignment of the locking device (10) to the NFC tag (82), in particular RFID tag, can be evaluated by means of the installation data.

12. The locking device according to claim 11, characterized in that an elongate base body (4) is provided, the elongate base body (4) having a first end (5) and a second end (6) spaced apart from the first end (5) in the longitudinal direction of the base body (4), the actuator (12), the near-field data transmission device (14), the memory unit (18), the processor device (20), the latch device (17), the energy source (17) and the directional antenna (80) are at least indirectly, and preferably directly, connected to the base body (4), in particular form a common assembly, the directional antenna (80) being arranged in the radial direction of the base body (4) for transmitting energy and/or data and/or signals, wherein at least one latch element (17) of the latch device is preferably provided in the region of the first end (5) of the base body (4), in particular at a closer distance from the first end (5) than from the second end (6) of the base body (4)

and/or the base body (4) preferably forms a front cover (7) for covering a container (1), in particular a safe, or has a front cover (7) for covering the container (1), in particular the safe and/or wherein the first end (5), in particular the front cover (7), comprises an actuating device for moving the base body (4), wherein the actuator (12), the near-field data transmission device (14), the memory unit (18), the processor device (20), the power source (22), the directional antenna (80) and the latch device (17) are arranged at a distance from the actuating device in the longitudinal direction.

13. The locking device according to claim 12, characterized in that the directional antenna (80) is an inductive element, and the directional antenna (80) is arranged or formed in conductor tracks of the circuit board or the directional antenna (80) is integrated in or arranged on the circumferential wall of the base body (4).

14. The locking device according to claim 13, characterized in that the latch element (17) is designed as a locking pin and the directional antenna (80) is arranged at a defined angle to the locking pin, wherein the directional antenna (80) is aligned in an operating state in a position by which it is predetermined that the locking pin is displaceable in a direction which differs from a direction oriented vertically downwards, in particular differs by at least +/−5° or at least +/−10° or at least +/−15° or at least +/−20°.

15. The locking device according to claim 14, characterized in that the near field data transmission device (14) can be controlled by the processor device (20) for transmitting target position data when the processor device (20) receives position signals and/or position data representing a target orientation of the locking device (10).

16. The locking device according to claim 15, characterized in that in response to the target position data transmitted by the near-field data transmission device (14), locking commands for locking the locking device (10) can be received from the near-field data transmission device (14), wherein the actuator (12) being controllable by the processor device (20) in dependence on the received locking commands for locking the locking device (10).

17. The locking device according to claim 16, characterized in that the near field data transmission device (14) is controllable by the processor device (20) for transmitting target position data when the processor device (20) receives position signals and/or position data representing a target orientation of the locking device (10) and when the processor device (20) receives locking signals and/or locking data of the locking sensor in the configuration in which the locking signals and/or locking data represent the presence of the latch element (17) in the latch receptacle.

18. The locking device according to claim 17, characterized in that a receiving device (92) for receiving at least one holding device (90) for holding at least one object (2), in particular at least one mechanical key, is provided and at least one detection device (96) for detecting the presence of the at least one holding device (90) in or on the receiving device (92) and for generating detection signals and/or detection data as a function of the detected presence is provided.

19. The locking device according to claim 18, characterized in that at least one power source (22) other than a fixed power supply is provided for operating at least one of the actuator (12), the near-field data transmission device (14), the memory unit (18), the detection device (96), and/or the processor device (20).

20. The locking device according to claim 19, characterized in that the receiving device (92) forms a defined receiving area for limiting the insertability of holding device (90) to holding device (90) having a corresponding shape and/or the receiving device (92) forms a receiving region, the receiving region being configured for positive and/or non-positive and/or field-locking retention of the holding device (90).

21. The locking device according to claim 20, characterized in that the detection device (96) is arranged in the region of the receiving region, in particular is arranged adjacent to the receiving region, the detection device (96) being at least indirectly and preferably directly connected to the processor device (20) for transmitting energy, data and/or signals to the processor device (20).

22. The locking device according to claim 21, characterized in that an elongate base body (4) is provided, the elongate base body (4) having a first end (5) and a second end (6) spaced from the first end (5) in the longitudinal direction of the base body (4), the actuator (12), the near-field data transmission device (14), the memory unit (18), the processor device (20), the latch device (17), the energy source (22), the receiving device (92) and the detection device (96) are at least indirectly, and preferably directly, connected to the base body (4), in particular form a common assembly, wherein the first end (5) has a front cover (7), wherein the front cover (7) in an operating configuration on the one hand faces the surroundings and on the other hand is oriented in the direction of the interior of the container (1), wherein the detection device is arranged or formed at a distance from the front cover in the longitudinal direction, and wherein the receiving device at least partially forms the second end.

23. The locking device according to claim 18, characterized in that the detection means (96) is a Hall sensor, wherein the Hall sensor generates a magnetic field signal and/or magnetic field data in dependency of a detected magnetic field and transmits the magnetic field signal and/or magnetic field data to the processor device (20), wherein the magnetic field signals and/or magnetic field data indicating whether the detected magnetic field has defined properties or has properties that deviate from the defined properties.

24. The locking device according to claim 18, characterized in that the detection device (96) is a directional antenna for receiving object signals and/or object data, wherein the object signals and/or object data can be generated by an NFC tag, in particular RFID tag, arranged on or generated in the holding device (90), wherein, the directional antenna for receiving object signals and/or object data is aligned in the axial direction of the base body (4).

25. The locking device according to claim 18, characterized in that the near field data transmission device (14) can be controlled by the processor device (20) for transmitting object data when the processor device (20) receives object data and/or object signals which represent a defined holding device (90)

or wherein the near field data transmission device (14) is controllable to transmit object data when the processor device (20) receives magnetic field signals and/or magnetic field data representing a defined magnetic field, wherein in response to the object data or magnetic data transmitted by the near-field data transmission device (14), locking commands for locking the locking device (10) can be received from the near-field data transmission device (14), wherein the actuator (12) being controllable by the processor device (20) as a function of the received locking commands for locking the locking device (10).

26. An electronic locking device for locking a container, in particular for retrofitting a key safe, comprising:

at least one of:

an electrically operable actuator (12) for transferring the electric locking device from a closed configuration to an open configuration, wherein the actuator can cause at least one latch element of a latch device to be moved from a latch receptacle to a region outside the latch receptacle, or an electrically operable actuator (12) for transferring the electric locking device from an open configuration into a closed configuration, wherein the actuator can cause the at least one latch element of the latch device to be moved from the region outside the latch receptacle into the latch receptacle, and a near-field data transmission device (14) for receiving data from at least one mobile terminal (16) temporarily located in a defined distance range from the electronic locking device (10) and for transmitting data, in particular access data, to the at least one mobile terminal (16) temporarily located in a defined distance range from the electronic locking device (10), a memory unit (18) for at least temporarily storing time data and/or access data, wherein the time data comprises at least data on the last opening time for reaching the opened configuration and/or at least data on the last closing time for reaching the closed configuration, wherein the access data comprises at least authorization data and identification data, the authorization data defining in dependence on which identification data the actuator transfers the locking device from the closed configuration to the opened configuration, and the identification data specifying an assignment to the mobile terminal, a processor device (20) for matching the authorization data and the identification data, wherein the actuator (12) can be controlled by the processor device (20) to open the locking device (10) in the event of a positive matching, wherein a positive matching represents a defined correspondence of the matched data, at least one sensor device (23) for detecting at least one movement of the locking device (10) and for generating sensor signals and/or sensor data in dependency of the detected movement, at least one power source (22) other than a fixed power supply for operating at least the actuator (12), the near field data transmission device (14), the memory unit (18), the processor device (20) and/or the sensor device (23), at least one control device (21) for activating one or more devices deactivated in an idle state, wherein the device deactivated in the idle state is at least one or more of the following devices: the actuator (12), the near-field data transmission device (14), the memory unit (18) and/or the processor device (20), wherein the control device (21) is connected to the sensor device (23) at least via a signal and/or data connection, wherein sensor data or sensor signals generated by the sensor device (23) can be transmitted to the control device (21) via the signal and/or data connection, wherein at least one deactivated device can be activated by the control device (21) in dependency of the sensor data or sensor signals, the processor device (20) can compare the sensor signals and/or sensor data of the sensor device (23) with defined sensor signals and/or defined sensor data, the defined sensor signals and/or defined sensor data representing a movement or a group of permissible movements and/or an impermissible movement or a group of impermissible movements, wherein the processor device (20) can trigger an alarm function if it is determined by the comparison that the sensor signals and/or sensor data represent movements which deviate from permissible movements and/or which correspond to impermissible movements, wherein the impermissible movement or the group of impermissible movements represent vibrations or shocks resulting from an impact of the locking device (10) with a tool, in particular a drill or a hammer or a chisel, wherein the processor device (20) can store the sensor signals and/or sensor data in the memory unit (18), wherein further data, in particular the time of the start of the sensor signal acquisition and/or sensor data acquisition and/or the end of the sensor signal acquisition and/or sensor data acquisition and/or date, can be acquired by the processor device (20) and can be stored in the memory unit (18), a lock sensor (62, 64) comprising a touch sensor (62) or a light barrier (64), for monitoring the closed configuration, wherein lock signals and/or lock data can be generated by the lock sensor (62, 64), wherein the lock signals and/or lock data in a locking configuration represent the presence of the latch element (17) in the locking position and/or wherein the lock signals and/or lock data in a manipulation configuration represent a position deviating from the locking position, wherein the alarm function which can be triggered by the processor device (20) can cause an alarm signal to be output, in particular via an optical and/or acoustic signal source of the electric locking device (10) and/or of the container, in dependency of the sensor signals and/or sensor data.

27. An opening device comprising a locking door, a locking lid or a locking flap, for installation in a container, the opening device comprising an electronic locking device (10) for locking the container, the electronic locking device (10) comprising:

at least one of:

an electrically operable actuator (12) for transferring the electric locking device from a closed configuration to an open configuration, wherein the actuator can cause at least one latch element of a latch device to be moved from a latch receptacle to a region outside the latch receptacle, or the electrically operable actuator (12) for transferring the electric locking device from an open configuration into a closed configuration, wherein the actuator can cause the at least one latch element of the latch device to be moved from the region outside the latch receptacle into the latch receptacle, and a near-field data transmission device (14) for receiving data from at least one mobile terminal (16) temporarily located in a defined distance range from the electronic locking device (10) and for transmitting data, in particular access data, to the at least one mobile terminal (16) temporarily located in a defined distance range from the electronic locking device (10), a memory unit (18) for at least temporarily storing time data and/or access data, wherein the time data comprises at least data on the last opening time for reaching the opened configuration and/or at least data on the last closing time for reaching the closed configuration, wherein the access data comprises at least authorization data and identification data, the authorization data defining in dependence on which identification data the actuator transfers the locking device from the closed configuration to the opened configuration, and the identification data specifying an assignment to the mobile terminal, a processor device (20) for matching the authorization data and the identification data, wherein the actuator (12) can be controlled by the processor device (20) to open the locking device (10) in the event of a positive matching, wherein a positive matching represents a defined correspondence of the matched data, at least one sensor device (23) for detecting at least one movement of the locking device (10) and for generating sensor signals and/or sensor data in dependency of the detected movement, at least one power source (22) other than a fixed power supply for operating at least the actuator (12), the near field data transmission device (14), the memory unit (18), the processor device (20) and/or the sensor device (23), at least one control device (21) for activating one or more devices deactivated in an idle state, wherein the device deactivated in the idle state is at least one or more of the following devices: the actuator (12), the near-field data transmission device (14), the memory unit (18) and/or the processor device (20), wherein the control device (21) is connected to the sensor device (23) at least via a signal and/or data connection, wherein sensor data or sensor signals generated by the sensor device (23) can be transmitted to the control device (21) via the signal and/or data connection, wherein at least one deactivated device can be activated by the control device (21) in dependency of the sensor data or sensor signals, wherein the processor device (20) can compare the sensor signals and/or sensor data of the sensor device (23) with defined sensor signals and/or defined sensor data, the defined sensor signals and/or defined sensor data representing a movement or a group of permissible movements and/or an impermissible movement or a group of impermissible movements, wherein the processor device (20) can trigger an alarm function if it is determined by the comparison that the sensor signals and/or sensor data represent movements which deviate from permissible movements and/or which correspond to impermissible movements, and wherein the actuator for transferring the latch element (17) from a manipulation configuration to a locking configuration can be actuated by the alarm function which can be triggered by the processor device (20) if the deviation from the locking configuration or the manipulation configuration can be determined by the locking sensor;

wherein the processor device (20) can store the sensor signals and/or sensor data in the memory unit (18), wherein further data, in particular the time of the start of the sensor signal acquisition and/or sensor data acquisition and/or the end of the sensor signal acquisition and/or sensor data acquisition and/or date, can be acquired by the processor device (20) and can be stored in the memory unit (18), a lock sensor (62, 64) comprising a touch sensor (62) or a light barrier (64), for monitoring the closed configuration, wherein lock signals and/or lock data can be generated by the lock sensor (62, 64), wherein the lock signals and/or lock data in one configuration represent the presence of the latch element (17) in the latch receptacle and/or wherein the lock signals and/or lock data in another configuration represent the presence of the latch element (17) outside the latch receptacle, wherein the lock signals and/or lock data in the locking configuration represent the presence of the latch element (17) in the locking position and/or wherein the lock signals and/or lock data in the manipulation configuration represent a position deviating from the locking position, wherein the alarm function which can be triggered by the processor device (20) can cause an alarm signal to be output, in particular via an optical and/or acoustic signal source of the electric locking device (10) and/or of the container, in dependency of the sensor signals and/or sensor data.

28. A container comprising a key safe, the key safe comprising an electronic locking device (10), the electronic locking device (10) comprising:

at least one of:

an electrically operable actuator (12) for transferring the electric locking device from a closed configuration to an open configuration, wherein the actuator can cause at least one latch element of a latch device to be moved from a latch receptacle to a region outside the latch receptacle, or the electrically operable actuator (12) for transferring the electric locking device from an open configuration into a closed configuration, wherein the actuator can cause the at least one latch element of the latch device to be moved from the region outside the latch receptacle into the latch receptacle, and a near-field data transmission device (14) for receiving data from at least one mobile terminal (16) temporarily located in a defined distance range from the electronic locking device (10) and for transmitting data, in particular access data, to the at least one mobile terminal (16) temporarily located in a defined distance range from the electronic locking device (10), a memory unit (18) for at least temporarily storing time data and/or access data, wherein the time data comprises at least data on the last opening time for reaching the opened configuration and/or at least data on the last closing time for reaching the closed configuration, wherein the access data comprises at least authorization data and identification data, the authorization data defining in dependence on which identification data the actuator transfers the locking device from the closed configuration to the opened configuration, and the identification data specifying an assignment to the mobile terminal, a processor device (20) for matching the authorization data and the identification data, wherein the actuator (12) can be controlled by the processor device (20) to open the locking device (10) in the event of a positive matching, wherein a positive matching represents a defined correspondence of the matched data, at least one sensor device (23) for detecting at least one movement of the locking device (10) and for generating sensor signals and/or sensor data in dependency of the detected movement, at least one power source (22) other than a fixed power supply for operating at least the actuator (12), the near field data transmission device (14), the memory unit (18), the processor device (20) and/or the sensor device (23), at least one control device (21) for activating one or more devices deactivated in an idle state, wherein the device deactivated in the idle state is at least one or more of the following devices: the actuator (12), the near-field data transmission device (14), the memory unit (18) and/or the processor device (20), wherein the control device (21) is connected to the sensor device (23) at least via a signal and/or data connection, wherein sensor data or sensor signals generated by the sensor device (23) can be transmitted to the control device (21) via the signal and/or data connection, wherein at least one deactivated device can be activated by the control device (21) in dependency of the sensor data or sensor signals, wherein the processor device (20) can compare the sensor signals and/or sensor data of the sensor device (23) with defined sensor signals and/or defined sensor data, the defined sensor signals and/or defined sensor data representing a movement or a group of permissible movements and/or an impermissible movement or a group of impermissible movements, wherein the processor device (20) can trigger an alarm function if it is determined by the comparison that the sensor signals and/or sensor data represent movements which deviate from permissible movements and/or which correspond to impermissible movements, and wherein the actuator for transferring the latch element (17) from a manipulation configuration to a locking configuration can be actuated by the alarm function which can be triggered by the processor device (20) if the deviation from the locking configuration or the manipulation configuration can be determined by the locking sensor;

wherein the processor device (20) can store the sensor signals and/or sensor data in the memory unit (18), wherein further data, in particular the time of the start of the sensor signal acquisition and/or sensor data acquisition and/or the end of the sensor signal acquisition and/or sensor data acquisition and/or date, can be acquired by the processor device (20) and can be stored in the memory unit (18), a lock sensor (62, 64) comprising a touch sensor (62) or a light barrier (64), for monitoring the closed configuration, wherein lock signals and/or lock data can be generated by the lock sensor (62, 64), wherein the lock signals and/or lock data in one configuration represent the presence of the latch element (17) in the latch receptacle and/or wherein the lock signals and/or lock data in another configuration represent the presence of the latch element (17) outside the latch receptacle, wherein the lock signals and/or lock data in the locking configuration represent the presence of the latch element (17) in the locking position and/or wherein the lock signals and/or lock data in the manipulation configuration represent a position deviating from the locking position, wherein the alarm function which can be triggered by the processor device (20) can cause an alarm signal to be output, in particular via an optical and/or acoustic signal source of the electric locking device (10) and/or of the container, in dependency of the sensor signals and/or sensor data.

29. A system, comprising:

at least a plurality of locking devices (1) for locking a container, in particular for retrofitting a key safe, comprising:

at least one of:

an electrically operable actuator (12) for transferring the electric locking device from a closed configuration to an open configuration, wherein the actuator can cause at least one latch element of a latch device to be moved from a latch receptacle to a region outside the latch receptacle, or the electrically operable actuator (12) for transferring the electric locking device from an open configuration into a closed configuration, wherein the actuator can cause the at least one latch element of the latch device to be moved from the region outside the latch receptacle into the latch receptacle, and a near-field data transmission device (14) for receiving data from at least one mobile terminal (16) temporarily located in a defined distance range from the electronic locking device (10) and for transmitting data, in particular access data, to the at least one mobile terminal (16) temporarily located in a defined distance range from the electronic locking device (10), a memory unit (18) for at least temporarily storing time data and/or access data, wherein the time data comprises at least data on the last opening time for reaching the opened configuration and/or at least data on the last closing time for reaching the closed configuration, wherein the access data comprises at least authorization data and identification data, the authorization data defining in dependence on which identification data the actuator transfers the locking device from the closed configuration to the opened configuration, and the identification data specifying an assignment to the mobile terminal, a processor device (20) for matching the authorization data and the identification data, wherein the actuator (12) can be controlled by the processor device (20) to open the locking device (10) in the event of a positive matching, wherein a positive matching represents a defined correspondence of the matched data, at least one sensor device (23) for detecting at least one movement of the locking device (10) and for generating sensor signals and/or sensor data in dependency of the detected movement, at least one power source (22) other than a fixed power supply for operating at least the actuator (12), the near field data transmission device (14), the memory unit (18), the processor device (20) and/or the sensor device (23), at least one control device (21) for activating one or more devices deactivated in an idle state, wherein the device deactivated in the idle state is at least one or more of the following devices: the actuator (12), the near-field data transmission device (14), the memory unit (18) and/or the processor device (20), wherein the control device (21) is connected to the sensor device (23) at least via a signal and/or data connection, wherein sensor data or sensor signals generated by the sensor device (23) can be transmitted to the control device (21) via the signal and/or data connection, wherein at least one deactivated device can be activated by the control device (21) in dependency of the sensor data or sensor signals, wherein the processor device (20) can compare the sensor signals and/or sensor data of the sensor device (23) with defined sensor signals and/or defined sensor data, the defined sensor signals and/or defined sensor data representing a movement or a group of permissible movements and/or an impermissible movement or a group of impermissible movements, wherein the processor device (20) can trigger an alarm function if it is determined by the comparison that the sensor signals and/or sensor data represent movements which deviate from permissible movements and/or which correspond to impermissible movements, and wherein the actuator for transferring the latch element (17) from a manipulation configuration to a locking configuration can be actuated by the alarm function which can be triggered by the processor device (20) if the deviation from the locking configuration or the manipulation configuration can be determined by the locking sensor;

wherein the processor device (20) can store the sensor signals and/or sensor data in the memory unit (18), wherein further data, in particular the time of the start of the sensor signal acquisition and/or sensor data acquisition and/or the end of the sensor signal acquisition and/or sensor data acquisition and/or date, can be acquired by the processor device (20) and can be stored in the memory unit (18), a lock sensor (62, 64) comprising a touch sensor (62) or a light barrier (64), for monitoring the closed configuration, wherein lock signals and/or lock data can be generated by the lock sensor (62, 64), wherein the lock signals and/or lock data in one configuration represent the presence of the latch element (17) in the latch receptacle and/or wherein the lock signals and/or lock data in another configuration represent the presence of the latch element (17) outside the latch receptacle, wherein the lock signals and/or lock data in the locking configuration represent the presence of the latch element (17) in the locking position and/or wherein the lock signals and/or lock data in the manipulation configuration represent a position deviating from the locking position, wherein the alarm function which can be triggered by the processor device (20) can cause an alarm signal to be output, in particular via an optical and/or acoustic signal source of the electric locking device (10) and/or of the container, in dependency of the sensor signals and/or sensor data;

a plurality of mobile terminals (16), wherein each mobile terminal (16) comprises a near-field data transmission means (34) for data exchange with the near field data transmission device (14) of the locking devices (1), and a far-field data transmission means (36), in particular LTE, for data exchange with a server device (38), and a processor unit (40) for executing a control application, and a storage device (42) for storing lock reconfiguration data and lock operation data, wherein the lock operation data is transmitted by the near field data transmission device (14) to the near field data transmission means (34) of the respective mobile terminal (16) for transmission to the server device (38), and wherein the lock operation data comprises at least time data and access data, wherein the time data comprises at least data on the last opening time and/or at least data on the last locking time, wherein the server device (38) comprises a cloud server device, wherein the server device (38) receives the lock operation data from the respective mobile terminal (16) and, after receiving the lock operation data, generates lock reconfiguration data and sends this to the mobile terminal (16) from which it received the lock operation data or sends it to another mobile terminal (16) which is assigned to the locking device (1) or sends it to a group of mobile terminals (16), wherein all mobile terminals (16) assigned to the group are assigned to the locking device (1).

* * * * *